US007292869B2

(12) United States Patent
Ukon

(10) Patent No.: US 7,292,869 B2
(45) Date of Patent: Nov. 6, 2007

(54) TELEPHONE EQUIPMENT INCLUDING A LINE HOLDING SYSTEM, AN EXTENSION COMMUNICATION DETECTING SYSTEM, AND A NOTIFICATION SYSTEM

(75) Inventor: Tsutomu Ukon, Kuwana (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 122 days.

(21) Appl. No.: 10/913,527

(22) Filed: Aug. 9, 2004

(65) Prior Publication Data
US 2005/0075132 A1 Apr. 7, 2005

(30) Foreign Application Priority Data
Aug. 28, 2003 (JP) .............................. 2003-304273

(51) Int. Cl.
*H04Q 7/20* (2006.01)
(52) U.S. Cl. .................. 455/465; 455/414.1; 455/418; 455/419; 455/420; 455/426.1; 455/426.2; 455/462; 455/507; 455/509; 455/555; 379/88.13; 379/162; 379/207.01; 379/215.01; 379/393
(58) Field of Classification Search ............. 455/414.1, 455/418–420, 426.1, 426.2, 462, 465, 507, 455/509, 555; 379/88.13, 162, 207.01, 215.01, 379/393
See application file for complete search history.

(56) References Cited

U.S. PATENT DOCUMENTS 4,882,746 A * 11/1989 Shimada ..................... 455/462
5,711,010 A * 1/1998 Naddell et al. ............. 455/509
5,894,504 A * 4/1999 Alfred et al. ............ 379/88.13
6,724,877 B1 * 4/2004 Kucmerowski et al. ...................... 379/215.01
6,760,581 B2 * 7/2004 Dutta ....................... 455/414.1
6,836,478 B1 * 12/2004 Huang et al. ................ 370/352

FOREIGN PATENT DOCUMENTS

| JP | A 8-47050 | * 2/1996 |
| JP | B2 2590104 | 12/1996 |
| JP | A 10-341296 | * 12/1998 |
| JP | A 2000-083098 | 3/2000 |

* cited by examiner

Primary Examiner—Steve M. D'Agosta
(74) Attorney, Agent, or Firm—Oliff & Berridge, PLC

(57) ABSTRACT

A telephone equipment having a main apparatus and a plurality of cordless handsets, which can perform an extension communication with being relayed by the main apparatus. Such a telephone equipment includes a line holding system that holds a connection between the main apparatus and the outside apparatus, an extension communication detecting system that detects start of the extension communication when the communication with respect to the outside apparatus is being held, a timer that measures a time period elapsed from the start of the extension communication, and a notification system that causes at least one of the cordless handsets performing the extension communication to perform a notifying operation when the time period measured by the timer exceeds a predetermined time period.

17 Claims, 14 Drawing Sheets

FIG. 1
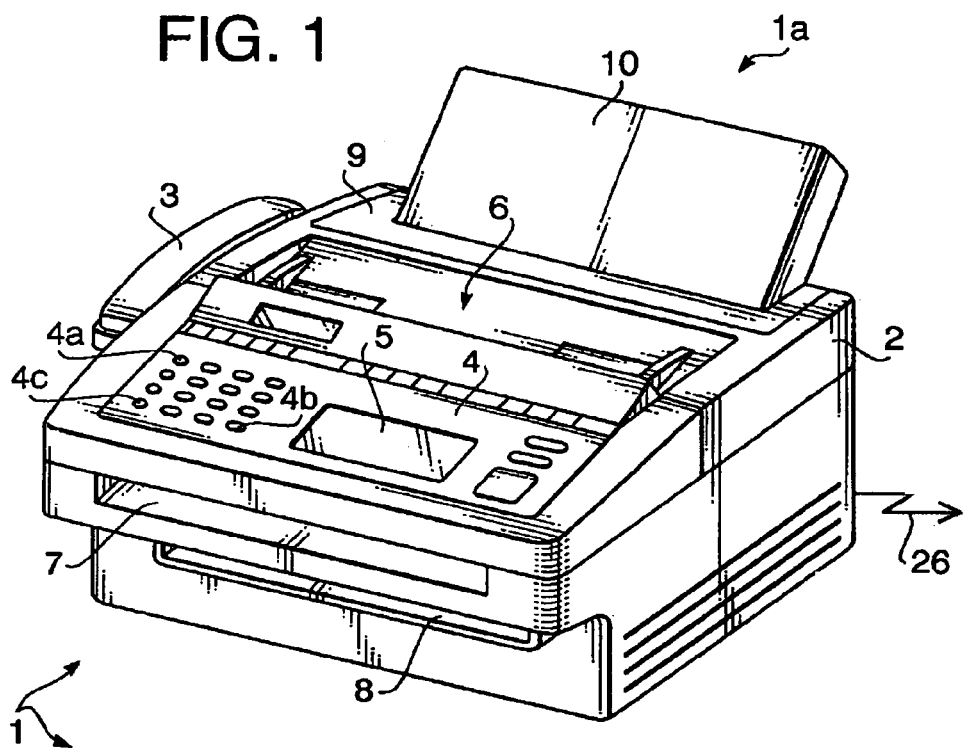
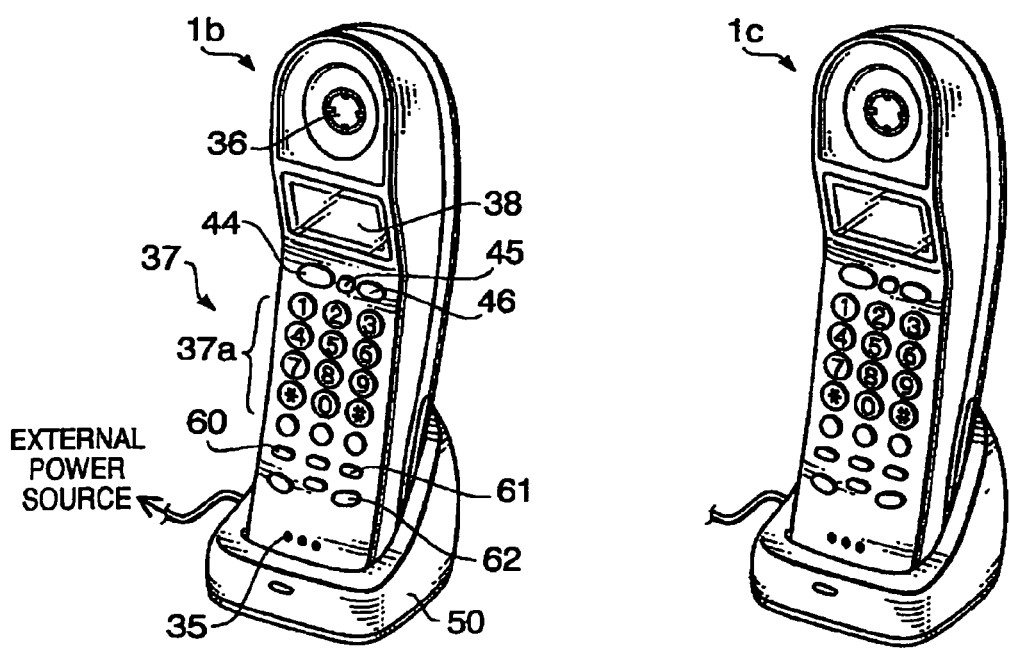

TELEPHONE EQUIPMENT INCLUDING A LINE HOLDING SYSTEM, AN EXTENSION COMMUNICATION DETECTING SYSTEM, AND A NOTIFICATION SYSTEM

BACKGROUND OF THE INVENTION

The present invention relates to a telephone equipment including a main telephone and cordless handsets, and particularly, to the telephone equipment in which an extension communication (i.e., a communication between the cordless handsets) can be performed.

Conventionally, telephone equipment having a function of the extension telephone communication has been known. The extension communication is performed between the cordless handsets via the main phone. The extension communication is realized, for example, by use of a transceiving function. In the extension communication using the transceiving function, when one of the cordless handsets operates in a transmitting mode, the other operates in a receiving mode. The transmitting mode and the receiving mode are switched by an operation at the cordless handsets, thereby a two-way (alternating) communication is realized. In such telephone equipment, when an outside line call is received and the call is transferred from one cordless handset to another, the outside line call is temporarily held, and the extension communication may be made between the cordless handsets.

In the conventional telephone equipment, when the holding state of the outside line call continues for a predetermined period, the call as held is forcibly connected to one of the cordless handsets, or the outside line call is forcibly cut.

When the outside line call is forcibly connected to one of the cordless handsets, a user of the cordless handset feels that the line is connected to the outside line call abruptly. In such a case, the user may confuse as he/she may not recognize whether the outstanding call is the outside line call or the extension call. When the outside line call is forcibly disconnected, a caller of the outside line call should make a call again, which gives the caller displeasure.

Japanese Patent No. 2590104 discloses telephone equipment which keeps the holding status of the outside line call even when the extension call lasts for a relatively long period. In this telephone equipment, in order to keep the holding state of the outside line call for a long period, a self-maintenance operation is performed by a power supply path for maintaining the holding state, thereby the holding state is maintained even if the extension call last relatively long.

According to the telephone equipment disclosed in the above-indicated patent, when the extension communication lasts for a relatively long period, the caller of the outside line call may be kept waiting for a long period, and may have an unpleasing feeling.

SUMMARY OF THE INVENTION

The present invention is advantageous in that, in the telephone equipment as described above, it is prevented that the holding state of the outside call lasts excessively long period even though the extension communication lasts relatively long period.

According to an aspect of the invention, there is provided a telephone equipment having a main apparatus and a plurality of cordless handsets, the main apparatus being connectable with an outside apparatus through a telephone line and the plurality of cordless handsets are configured to be able to perform an extension communication with being relayed by the main apparatus. Such a telephone equipment further includes a line holding system that holds a connection between the main apparatus and the outside apparatus, an extension communication detecting system that detects start of the extension communication when the communication with respect to the outside apparatus is being held, a timer that measures a time period elapsed from the start of the extension communication, and a notification system that causes at least one of the cordless handsets performing the extension communication to perform a notifying operation when the time period measured by the timer exceeds a predetermined time period.

Optionally, the extension communication detecting system and the timer may be provided to the main apparatus, and the main apparatus may include a instructing system that instructs at least one of the cordless handsets performing the extension communication when the time period measured by the timer exceeds the predetermined time period.

In this case, each of the cordless handsets may be configured to perform the notifying operation when it receives an instruction issued by the instructing system from the main apparatus.

Alternatively, the extension communication detecting system and the timer may be provided to each of the cordless handsets. In this case, when the time period measured by the timer exceeds the predetermined time period, the notification system may cause each of the cordless handsets to perform the notifying operation.

In a particular configuration, each of the cordless handsets may be configured such that one of a communication with the outside apparatus connection with which is currently held and the extension communication currently held after the notifying operation was performed.

Optionally, each of the cordless handset may be provided with a display system capable of displaying letters and figures, and the communication with the outside apparatus and the extension communication may be displayed on the display system as selectable items.

Further optionally, the main apparatus may include a setting system that sets the telephone equipment in a condition of storing an incoming message from the outside apparatus when the main apparatus receives none of the choices of the communication with the outside apparatus and the extension communication from the cordless handset in which the notifying operation has been performed, and a disconnecting system that disconnects the connection between the main apparatus and the outside apparatus when the condition of storing the incoming message from the outside apparatus has been maintained for a predetermined storing period.

Still optionally, the detecting system and the timer may be provided to each of the cordless handsets, and each of the plurality of cordless handsets may be configured to transmit a disconnection signal to the main apparatus, the disconnection signal requesting for disconnection of the connection with the outside apparatus when an elapsed time period measured by the timer exceeds the predetermined period. Further, the main apparatus may be configured to transmit a re-connection signal which is output in response to the disconnection signal to the cordless handset that has transmitted the disconnection signal, and when the cordless handset receives the re-connection signal from the main apparatus, the notifying system may cause the cordless handset that has received the re-connection signal to execute the notifying operation.

Further, the telephone equipment may include a setting system that sets the telephone equipment in a condition for storing an incoming message from the outside apparatus when a connection with the cordless handset, which has transmitted the disconnection signal to the main apparatus, cannot be established, and a disconnecting system that disconnects the connection between the main apparatus and the outside apparatus when the condition of storing the incoming message from the outside apparatus has been maintained for a predetermined storing period.

In a particular case, the extension communication detecting system may be configured to detect that the extension communication is started when an operation for executing the extension communication is performed in the cordless handset is detected.

Optionally, the cordless handsets may be configured such that a communication therebetween is performed by alternately switching the operating condition of the cordless handsets between a transmitting condition and receiving condition. Further, the extension communication detecting system may include a standby condition detecting system that detects a standby condition representing a condition where none of the transmitting condition and receiving condition is selected. When one of the transmitting condition and receiving condition is selected after the standby condition detecting system has detected the standby condition, the timer may be reset so that the measure time period is cleared and the timer is set to an initial value.

The telephone equipment may further include a switching system that enables an operation mode to be switched between a first mode in which the notifying operation is executed and a second mode in which the notifying operation is not executed.

Further optionally, each of the cordless handsets may include a sound output system, the notification system executing the notifying operation by outputting sound through the sound output system.

In this case, the sound output through the sound output system for notification may be different from a ringing tone output through the sound output system.

Optionally or alternatively, each of the cordless handset may include a lighting system, the notification system executing the notifying operation by actuating the lighting system.

Optionally or alternatively, each of the cordless handset may include a displaying system, the notification system executing the notifying operation by displaying a predetermined message on the displaying system.

Further optionally, each of the cordless handsets may include a sound output system for notification, an output volume of the sound output system being adjustable, and a lighting system for notification, one of the sound output system and the lighting system being selectable for notification. With this configuration, when the sound output system is selected for notification and the output volume is set to its minimum value, the sound output system is not used for notification and the lighting system is used for notification.

According to another aspect of the invention, there is provided a cordless handset for telephone equipment having a main apparatus and a plurality of cordless handsets, the main apparatus being connectable with an outside apparatus through a telephone line, at least two cordless handsets being capable of performing an extension communication therebetween with being relayed by the main apparatus. The cordless handset may include an extension communication detecting system that detects start of the extension communication when the connection between the main apparatus and the outside apparatus is being held, a timer that measures a time period elapsed from the start of the extension communication, and a notification system that performs a notifying operation when the time period measured by the timer exceeds a predetermined time period.

According to a further aspect of the invention, there is provided a program product containing computer executable instructions that control a telephone equipment having a main apparatus and at least two cordless handsets, the main apparatus being connectable with an outside apparatus through a telephone line, the at least two cordless handsets being capable of performing an extension communication through the main apparatus. The instructions cause the telephone equipment to include functions of a line holding system that holds a connection between the main apparatus and the outside apparatus, an extension communication detecting system that detects start of the extension communication when the communication with respect to the outside apparatus is being held, a timer that measures a time period elapsed from the start of the extension communication, and a notification system that causes at least one of the cordless handsets performing the extension communication to perform a notifying operation when the time period measured by the timer exceeds a predetermined time period.

Optionally, the instructions may cause the main apparatus to have the functions of the extension communication detecting system and the timer, and the main apparatus may include an instructing system that instructs at least one of the cordless handsets performing the extension communication when the time period measured by the timer exceeds the predetermined time period.

Alternatively or optionally, the instructions may cause each of the cordless handsets to have functions of the extension communication detecting system and the timer, and, when the time period measured by the timer exceeds the predetermined time period, the notification system causes each of the cordless handsets to perform the notifying operation.

BRIEF DESCRIPTION OF THE ACCOMPANYING DRAWINGS

FIG. 1 shows perspective view of telephone equipment including a main apparatus and cordless handsets according to an embodiment of the invention;

DETAILED DESCRIPTION OF THE EMBODIMENTS

Figure 2:
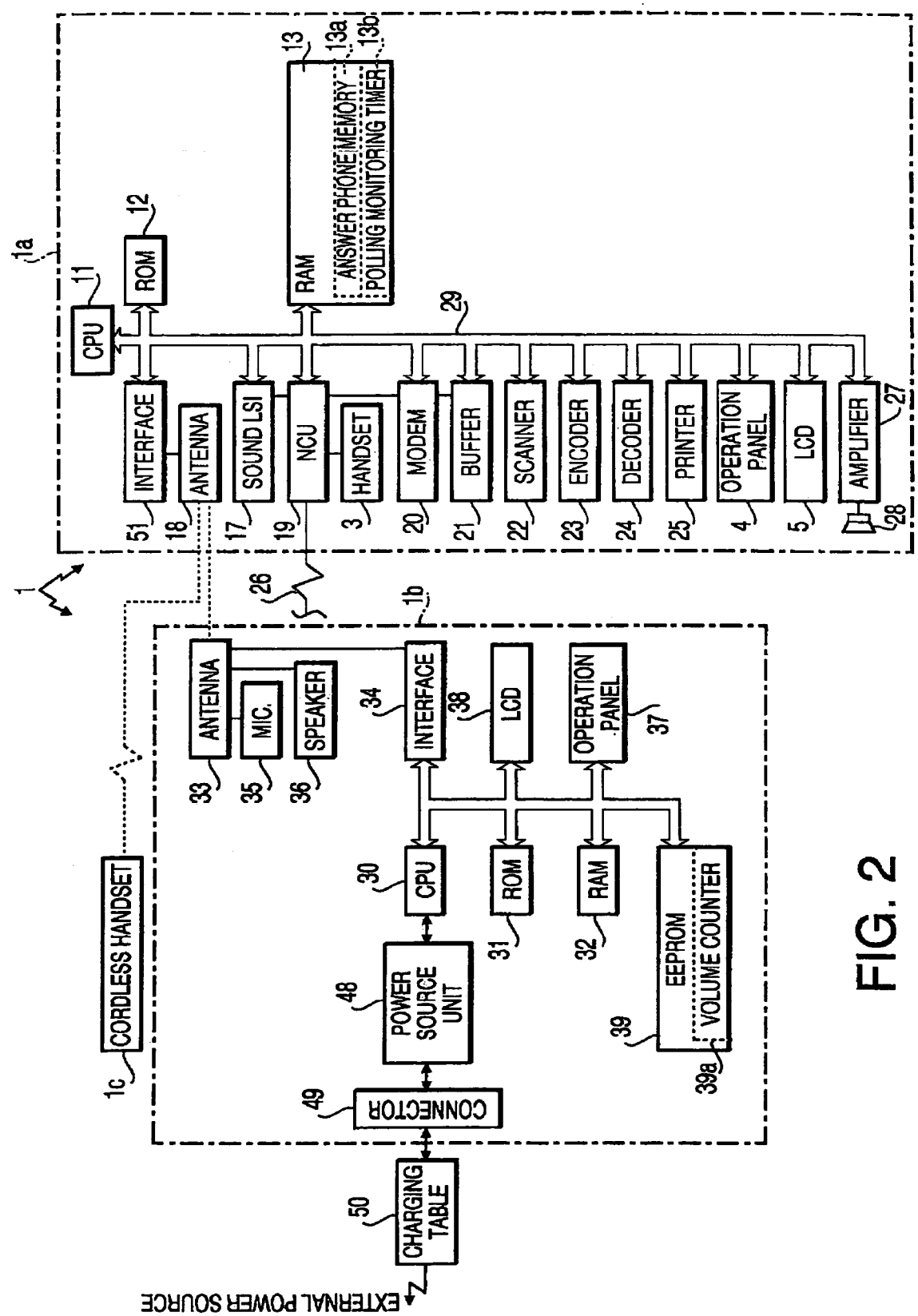
FIG. 2 is a block diagram of the telephone equipment shown in FIG. 1.

Referring to the accompanying drawings, telephone equipment according to embodiments of the invention will be described.

FIG. 1 shows a perspective view of telephone equipment 1 which includes a main apparatus 1a and cordless handsets 1b and 1c capable of performing wireless communication thereamong.

The main apparatus 1a is an MFD (multi-function device) having functions of telephone, facsimile and mailer using a telephone line 26. Further, the main apparatus 1a is configured such that a voice message is received from an outside line apparatus (which will be referred to as an outside line apparatus hereinafter) through the telephone line 26 can be stored, and that the stored message can be output upon request by a user of the main apparatus or cordless handset.

On a side portion of a main body 2 of the main apparatus 1a, a handset 3 (wired handset) is provided. The handset 3 is placed on a hook (not shown) when telephone communication is not performed. When the telephone communication using the handset 3 is performed, the handset 3 is picked up from the hook. The former state will be referred to an ON hook state, and the latter will be referred to as an OFF hook state.

On an upper front portion of the main body 2, an operation panel 4 is provided. The operation panel 4 is provided with a plurality of keys including input keys for inputting numbers and characters, and command input keys for inputting operational commands. At a left-hand side portion of the operation panel 4, a hold key 4a and an extension key 4c, which are command input keys, are provided. The hold key 4a is operated to hold the outside call (i.e., to set a connection between the main apparatus 1a and the outside line apparatus into a holding state). The extension key 4c is operated for performing a communication with respect to one of the cordless handsets 1b and 1c. At the central area of the operation panel 4, an LCD (Liquid Crystal Device) 5 is provided. The LCD 5 displays operational states and guidance for operation using the command input keys and ten keys 4b, operations executed by the main apparatus 1a, a state of communication between the main apparatus 1a or cordless handset 1b or 1c and an outside apparatus connected through the telephone line 26. A touch panel is provided to cover the image display screen of the LCD 5.

On a rear side of the operation panel 4 and the LCD 5, an original inlet 6 is formed. The original for facsimile transmission is inserted in the original inlet 6 with its image surface facing downward. After the original is scanned (i.e., the original image is read), the original is discharged from an original outlet 7 provided below the operation panel 4. Behind the original inlet 6, a recording sheet holder installation part 9, to which a recording sheet holder 10 capable of holding a plurality of recording sheets in a stacked manner is detachably attached. The recording sheet supplied from the recording sheet holder 10 and used for printing (i.e., an image is printed thereon) is discharged from a recording sheet outlet 8 provided below the original outlet 7.

The main body 2 contains an antenna 18 (see FIG. 2) that is used of transmitting/receiving various signals and data to/from the cordless handsets 1b and 1c. Thus, the main apparatus 1a is connected with the cordless handsets 1b and 1c through the antenna 18, and an electromagnetic wave is used for data communication between the main apparatus 1a and the cordless handsets 1b and 1c. It should be noted that the configuration is only an example, and communication between the main apparatus 1a and the cordless handsets 1b and 1c may be established using another means such as cables.

Each of the cordless handsets 1b and 1c, which are connected with the main apparatus through the antenna 18, is a communication device provided with an antenna 33 (see FIG. 2). Each of the cordless handsets 1b and 1c is provided with an operation panel 37 and an LCD 38. As shown in FIG. 1, at a central portion of the operation panel 37, ten keys 37a for inputting numbers and characters are provided. Above the ten keys 37a, an outside line key 44 to be operated for connecting to the telephone line 26, a call mode switching key 45 to be operated to switch a mode of an extension communication between a transmitting mode and a receiving mode, and a disconnect key 46 to be operated to terminate the extension communication or the connection with the telephone line 26 (i.e., the connection with the outside apparatus). In this exemplary embodiment, the extension communication is realized by a transceiver communication, and a transmitting state and a receiving state is switched by operating the call mode switching key 45.

Below the ten keys 37a, a left cursor key 60 and a right cursor key 61, an extension key 62 and a hold key 63 are provided. The left cursor key 60 and the right cursor key 61 are used for adjusting volume of a timeout notifying sound, which will be described later. The extension key 62 is used to initiate the extension communication. The hold key 63 is operated to hold the connection with the outside apparatus. The LCD 38 displays operational states of various keys provided to each of the cordless handsets 1b and 1c, operation guidance, a connection status with respect to the main apparatus 1a and a connection state of the outside apparatus connected through the telephone line 26.

At a lower position of a casing of each of the cordless handsets 1b and 1c, a microphone 35 that converts speech of a user to an electrical signal is provided. At an upper position of the casing of each cordless handset 1b (1c), a speaker 36 that converts an electrical signal to audible sound is provided. By use of the microphone 35 and the speaker 36, an audio communication can be performed between the cordless handsets 1b and 1c, between the cordless handset 1b or 1c and the main apparatus 1a and, or between the cordless handset 1b or 1c and the outside apparatus through the telephone line 26.

Each of the cordless handsets 1b and 1c are detachably placed on a charging stand 50. The charging stand 50 is for charging the cordless handset 1b (1c) with a predetermined voltage. The charging stand 50 is connected to a not-shown external power source, and the power supplied from the external power source is supplied to the cordless handset 1b (1c) placed on the charging stand 50.

Specifically, when the cordless handset 1b (1c) is placed on the charging stand 50, a connector 49 (see FIG. 2) is electrically connected to the charging stand 50. When the cordless handset 1b (1c) is electrically connected to the charging stand 50, it is set to the ON hook state. When the cordless handset 1b (1c) is picked up from the charging stand 50 (i.e., when the connector 49 is electrically disconnected from the charging stand 50), the cordless handset 1b (1c) is set to the OFF hook state. That is, when the cordless handset 1b (1c) is picked up from the charging stand 50, the telephone line is closed.

FIG. 2 shows a block diagram of the main apparatus 1a and cordless handsets 1b and 1c. Since the cordless handsets 1b and 1c have the same configuration, only the configuration of the cordless handset 1b is shown in FIG. 2. The main apparatus 1a includes a CPU (Central Processing Unit) 11, a ROM (Read Only Memory) 12, a RAM (Random Access Memory) 13, an audio LSI 17, an NCU (Network Control Unit) 19, an interface 51, a MODEM 20, a buffer 21, a scanner 22, a coding unit 23, an encoding unit 24, a printer 25, the operation panel 4, the LCD 5 and an amplifier 27, which are interconnected through a bus line 29.

The NCU 19 is for telephone line control, and the main apparatus 1a is connected to the telephone line through the NCU 19. The NCU 19 receives a calling signal and various other signals transmitted from a telephone switchboard and transmits a dialing signal to make a call according to the operation of the input keys on the operation panel 4 or 37 to the telephone switchboard. The NCU 19 also operates to allow data communication including transmission/reception of analog audio signals when the telephone line circuit is closed. The handset 3 of the main apparatus 1a is directly connected to the NCU 19.

The CPU 11 controls each unit connected to the bus line 29 in accordance with the signals transmitted/received through the NCU 19 to perform data communication (i.e., to realize the facsimile function, telephone function etc.). The ROM 12 is a non-rewritable memory storing control programs executed in the main apparatus 1a. The facsimile function and the telephone function are realized by the control programs stored in the ROM 12.

The RAM 13 temporarily stores various data. The RAM 13 includes a message recording memory 13a and a polling monitoring timer 13b. The message recording memory 13a is a memory for storing incoming messages transmitted from the outside apparatus and received by the function of an answer phone. Messages received through the telephone line 26 are in the form of analog audio signal, which is converted into digital audio signal by use of an audio LSI 17, and then stored in the message recording memory 13a. When the incoming messages are stored, times when the messages are received are detected, and the messages are stored together with their received times, respectively, in the message recording memory 13a. The messages stored in the message recording memory 13a are deleted when a predetermined cancellation operation is executed.

The polling monitoring timer 13b is a timer used for monitoring an operation status of the cordless handsets 1b and 1c when a connection status monitoring procedure is executed by the CPU 11 of the main apparatus 1a. The polling monitoring timer 13b stores a value which is incremented at every predetermined time interval when neither of the cordless handset 1b nor cordless handset 1c is operated, and the polling monitoring timer 13b is reset when one of the cordless handset 1b or 1c is operated.

In a predetermined area of the RAM 13, decoded facsimile data is temporarily stored. The stored facsimile data is then transmitted to the printer 25. After the printer 25 printed out the facsimile data on a recording sheet, the facsimile data stored in the predetermined area of the RAM 13 is deleted. The facsimile data is typically image data, the size of which is relatively large and requires a large storage area. Since the facsimile data is deleted after it is printed, the storage area of the RAM 13 can be used efficiently.

The audio LSI 17 converts the analog audio signal received by the NCU 19 into a digital audio signal. Further, the audio LSI 17 converts a digital audio signal generated inside the main apparatus 1a into an analog audio signal, which is transmitted to the NCU 19. The audio LSI 17 also functions, when the digitized incoming message stored in the message recording memory 13a is replayed, to convert the digitized message stored in the message recording memory 13a to an analog audio signal. The incoming messages converted into the analog signals are output from the speaker 28 of the main apparatus 1a or the speaker 36 of the cordless handset 1b or 1c.

The interface 51 defines contact points among different devices for data communication, and defines an electrical standard for electrically connecting the different devices. In particular, the interface 51 is for enabling data transmission/reception to/from each of the cordless handsets 1b and 1c. Signals transmitted from the main apparatus 1a to each of the cordless handsets 1b and 1c are transmitted from the antenna 18 connected to the interface 51, while signals transmitted from each of the cordless handsets 1b and 1c to the main apparatus 1a are received by the interface 51 through the antenna 18, and is input to the CPU 11.

The modem 20 performs modulation/demodulation of image data and e-mail data. The modem 20 further functions to transmit/receive various procedure signals for transmission control. A buffer 21 temporarily stores encoded facsimile data transmitted/received to/from another facsimile device and/or image data of an original scanned by the scanner 22.

The scanner 22 is for scanning an image of the original inserted in the original inlet 6. The encoding unit 23 encodes the image of the original scanned by the scanner 22. The decoding unit 24 retrieves the facsimile data temporarily stored in the buffer 21 and decodes the retrieved data. The decoded data (i.e., images) is once stored in the RAM 13, then printed on a recording sheet and then images represented by the decoded data are printed on recording sheet one by one.

The operation panel 4 enables the user to perform various operations including setting of the main apparatus 1a. The amplifier 27 amplifies the audio signal so that the audible sound of ringing tone, voice messages etc. are output through the speaker 28.

Next, an electrical configuration of the cordless handsets 1b and 1c will be described. As aforementioned, since the cordless handsets 1b and 1c have the same configuration, only the cordless handset 1b will be described.

The cordless handset 1b includes a CPU 30, a ROM 31, a RAM 32, an EEPROM (Electrically Erasable Programmable ROM) 39, an interface 34, an operation panel 37 and the LCD 38, which are interconnected with each other.

The EEPROM 39 is a rewritable non-volatile memory, and data stored in the EEPROM 39 is held (i.e., remains undeleted) even after the power supply is stopped. The EEPROM 39 is provided to store various data and setting values modified/registered by the user. According to the embodiment, the EEPROM 39 is provided with a volume counter 39a. The volume counter 39a is a counter for storing a value representing a volume of a ringing tone of the cordless handset 1b and a notifying tone for notifying the user that a connection between the main apparatus 1a and the outside apparatus has been kept in the holding state for more than a predetermined period. In the embodiment, the ringing tone and the notifying tone are different tones. According to the embodiment, the notifying tone is a buzzer tone.

The antenna 33 is used when data transmission/reception is performed between the cordless handset 1b and the main apparatus 1a. The antenna 33 is connected to the interface 34, the microphone 35 and the speaker 36. The analog audio signal transmitted by the main apparatus 1a is received by the antenna 33 and then transmitted to the speaker 36, while the analog audio signal input through the microphone 35 (i.e., a speech of the user) is transmitted from the antenna 33.

The interface 34 defines an electrical specification which defines an arrangement of contacts used for data communication between different devices. The various signals transmitted from the cordless handset 1b to the main apparatus 1a are transmitted to the antenna 33 through the interface 34. Further, the various signals transmitted from the main apparatus 1a to the cordless handset 1b are received by the antenna 33 and then input to the CPU 30 through the interface 34.

The cordless handset 1b is connected to the charging table 50 through the connector 49. As the cordless handset 1b connected to the connector 49, the power from the external power supply is applied to the cordless handset 1b. The supplied power is applied to a built-in power unit 48 via the connector 49. The power unit 48 is provided with a secondary battery, which is chargeable, and the applied power chares the secondary battery. Therefore, even when the cordless handset 1b is picked up from the charging table 50 when operated, the power supply to the cordless handset 1b is guaranteed since the charged secondary battery supplies the power to the cordless handset 1b.

The CPU 30 keeps monitoring the connection status of the connector 49 with respect to the charging table 50. When the CPU 30 recognizes that the connector 49 is disconnected from the charging table 50, the CPU 30 connects to the telephone line 26 (i.e., the off-hook status is realized), while when the disconnected connector 49 is connected to the charging table 50, the CPU 30 disconnects the telephone line 26 (i.e., the on-hook status is realized).

Next, an extension communication when the connection between the main apparatus 1a and the outside line apparatus is held will be described. When the main apparatus 1a and the outside apparatus are connected through the telephone line 26, if the hold key 4a is operated, the connection between the main apparatus 1a and the outside apparatus is held. Thereafter, the user of the main apparatus 1a operates the extension key 4c, and then the ten keys 4b corresponding to a destination cordless handset. For example, when the user intends to call the cordless handset 1b, the user operates "1" key of the ten keys 4b, while when the user intends to call the cordless handset 1c, the user operates "2" key of the ten keys 4b. In the description below, a case where the "1" is operated will be explained. It should be noted that the each of the cordless handsets 1b and 1c is also provided with an extension key 62, and by operating the extension key 62 and then operating a "0" key of the ten keys 37a, the user can make an extension call to the main apparatus 1a.

When called from the main apparatus 1a, on the cordless handset 1b side, the ringing tone is made. At the same time, an indication informing that the extension communication is made by the main apparatus 1a is made on the LCD 38, thereby the user of the cordless handset 1b recognizes the extension communication is made by the main apparatus 1a. As the user picks up the cordless handset 1b from the charging table 50, the cordless handset 1b is brought into the condition where the user can communicate with the user of the main apparatus 1a.

When the extension communication between the main apparatus 1a and the cordless handset 1b is finished, and when the extension communication between the cordless handsets 1b and 1c is to be performed, the call mode switching key 45 of the cordless handset 1b is operated to call the cordless handset 1c. When called from the cordless handset 1b, on the cordless handset 1c side, the ringing tone is sounded. At the same time, an indication informing that the extension call is made by the cordless handset 1b is made on the LCD 38, thereby the user of the cordless handset 1c recognizes the extension communication is made by the main apparatus 1a. As the user picks up the cordless handset 1c from the charging table 50, the cordless handset 1c is brought into a condition where the user of the cordless handset 1b can communicate with the user of the cordless handset 1c.

As aforementioned, the extension communication between the cordless handsets 1b and 1c is executed by use of a transceiver communication. Therefore, when the call mode switching key 45 is operated to maintain a transmitting state in one cordless handset (e.g., 1b), the other cordless handset (e.g., 1c) only functions as a receiver, vice versa. As such, by operating the call mode switching key 45, functions of transmitter and receiver are switched alternately, thereby bi-direction communication can be performed between the cordless handsets 1b and 1c.

When the extension communication between the cordless handsets 1b and 1c is finished, and the user of the one of the cordless handset 1b and 1c intends to connect to the outside line, the user operates the outside line key 44. Then, the cordless handset of which the outside line key 44 is operated is connected to the outside apparatus, and a communication therebetween is enabled.

Next, referring to FIGS. 3 and 4, a procedure of monitoring the transition of the conditions of the cordless handsets 1b and 1c configured as above will be described.

Figure 3:
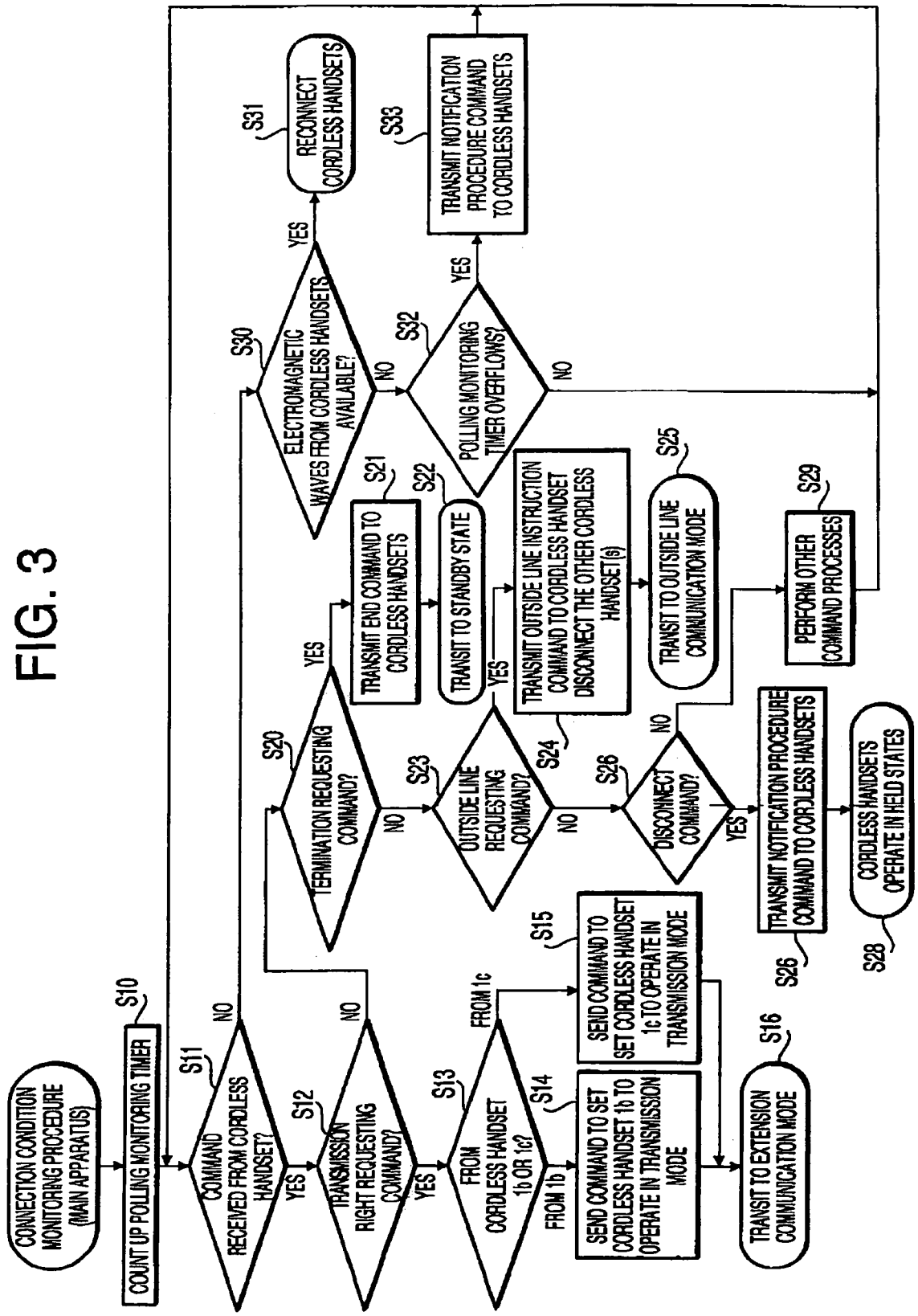
FIG. 3 shows a flowchart illustrating a main apparatus side connection monitoring procedure executed by a CPU of the main apparatus shown in FIG. 1, according to a first embodiment of the invention.
Figure 4A:
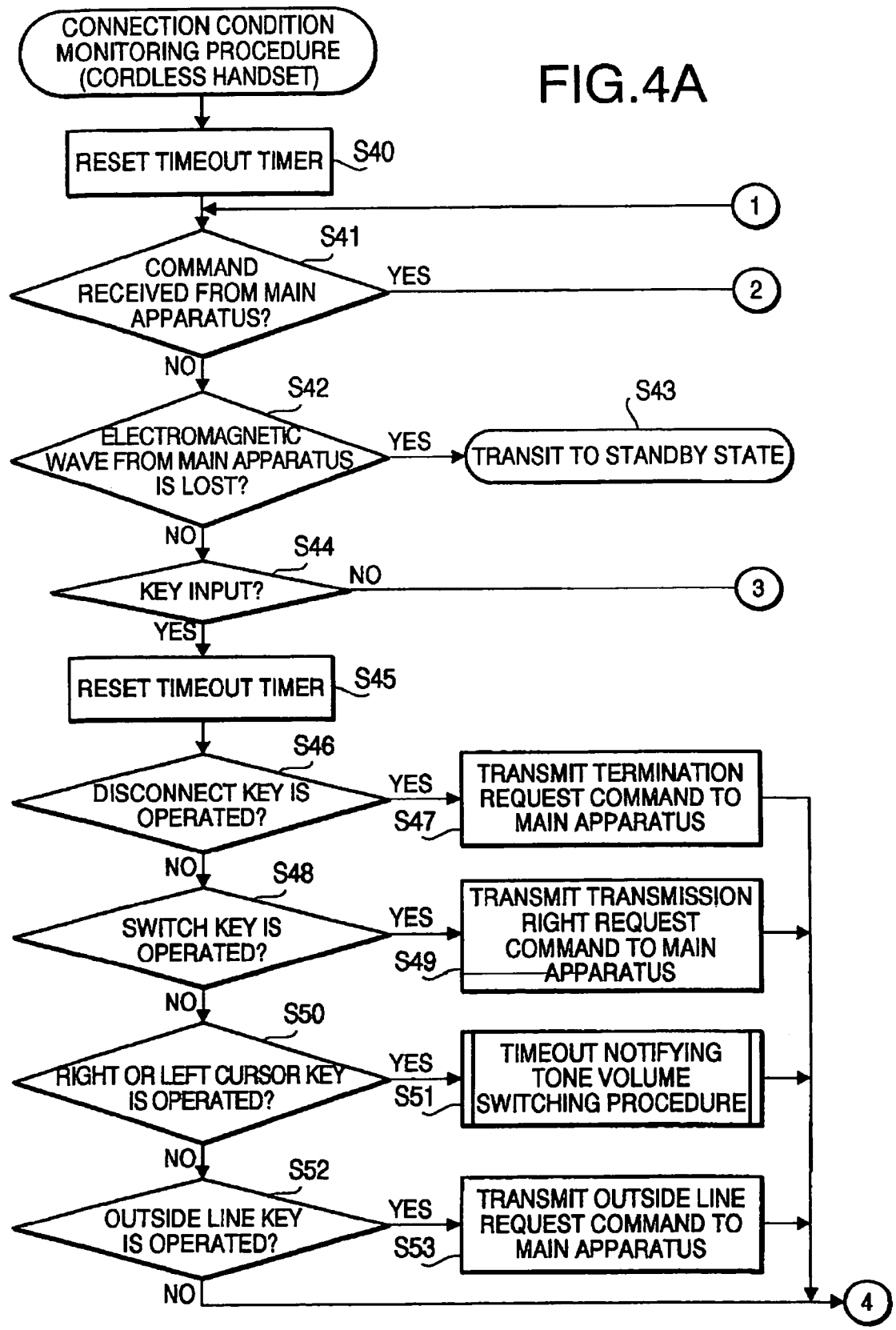
FIGS. 4A and 4B show a flowchart illustrating a cordless handset side connection monitoring procedure executed by a CPU of the cordless handset shown in FIG. 1, according to the first embodiment of the invention.
Figure 4B:
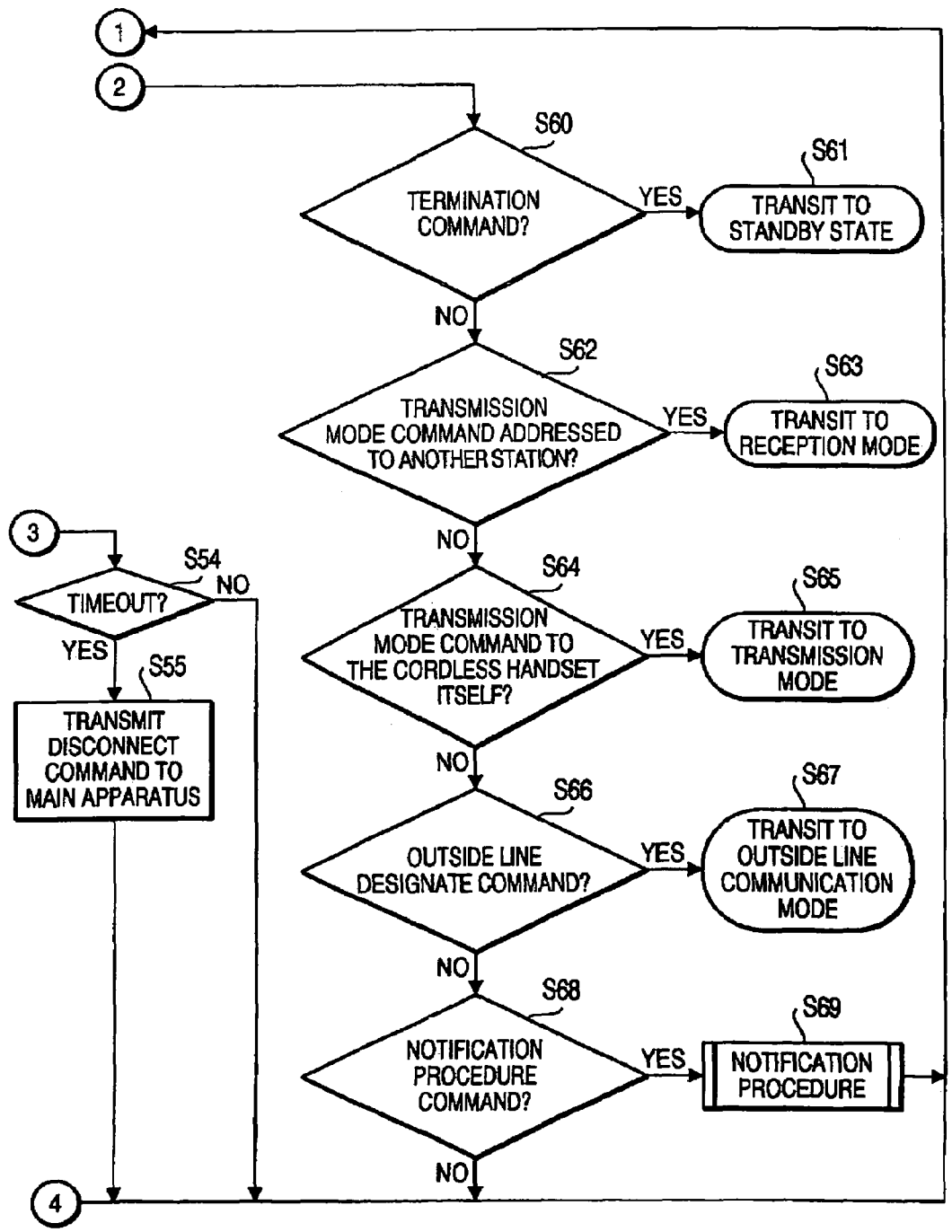

FIG. 3 shows a flowchart illustrating a main apparatus side connection condition monitoring procedure, and FIGS. 4A and 4B show a flowchart illustrating a cordless handset side connection condition monitoring procedure.

In the description below, a case where a call is made from the outside apparatus will be described. In this example, the user of the cordless handset 1b receives the call and holds the call to have the user of the cordless handset 1c replay the call. For this purpose, the extension communication is firstly performed between the cordless handset 1b and 1c with holding the call from the outside apparatus. In this exemplary case, the user of the cordless handset 1b performs a predetermined holding operation (e.g., operation of a hold key for the connection between the cordless handset 1b and the outside line apparatus), a holding instruction is transmitted to the main apparatus 1a, and the connection between the main apparatus 1a and the outside apparatus is held. In this condition, when the user of the cordless handset 1b operates the extension key 62 to start the extension communication with the cordless handset 1c, the main apparatus side monitoring procedure and the cordless handset side monitoring procedure are started.

When the main apparatus side monitoring procedure is started, the polling monitoring timer 13b starts counting up (i.e., starts measuring a passage of time) (S10). The polling monitoring timer 13b is a timer for monitoring a time passage after the extension communication between the cordless handsets 1b and 1c was started, and counts up (i.e.

increments) a timer value stored in the RAM 13 at the passage of every predetermined period.

When the count-up of the polling monitoring timer 13*b* is initiated, the CPU 11 determines whether a command is received from the cordless handset 1*b* or 1*c* (S11). When the CPU 11 determines that a command has been received from the cordless handset 1*b* or 1*c* (S11: YES), control proceeds to S12. The steps after S12 represent a process of determining the content of the command transmitted from the cordless handset 1*b* or 1*c*, and the transmission of such a command is done in the cordless handset side monitoring procedure. The cordless handset side monitoring procedure will be determined below. Since the same cordless handset side monitoring procedure is executed in the cordless handsets 1*b* and 1*c*, the description below is made only for the procedure executed in the cordless handset 1*b*.

When the cordless handset side monitoring procedure shown in FIGS. 4A and 4B is executed in the cordless handset 1*b*, the CPU 30 of the cordless handset 1*b* resets a timeout timer (S40). The timeout timer is a timer for measuring a time period during which the cordless handset 1*b* is not operated. When one of the keys of the cordless handset 1*b* is operated, the timeout timer is reset and the measurement is re-started from a value of zero.

In step S40, when the timeout timer is reset, the CPU 30 determines whether the command is received from the main apparatus 1*a* (s41). When no command has been received from the main apparatus 1*a* (S41: NO), the CPU 30 determines whether an electric wave from the main apparatus 1*a* is cut off (S42). When the cordless handset 1*b* is located out of a connectable range or connection between the main apparatus 1*a* and the cordless handset 1*b* is cut, the electromagnetic wave from the main apparatus 1*a* is cut off (S42: YES). In such a case, the CPU 30 cannot monitor the connection condition between the main apparatus 1*a* and the cordless handset 1*b*, and sets the cordless handset 1*b* in a holding state (S43). The holding state is a condition where the CPU 30 waits for some operation of the cordless handset 1*b*.

When the CPU 30 determines that transmission/reception of commands between the cordless handset 1*b* and the main apparatus 1*a* can be performed (S42: YES), the CPU 30 determines whether a key operation is performed (S44). When there is a key operation (S44: YES), the CPU 30 resets the timeout timer as the operation of the cordless handset 1*b* is detected (S45).

After resetting the timeout timer in S45, the CPU 30 determines which key has been operated in the following steps. In S46, the CPU 30 determines whether the disconnect key 46 is depressed. The disconnect key 46 is typically operated when a telephone communication between the user of the cordless handset 1*b* speaks and the user of the outside apparatus through the telephone line 26 is finished and the telephone line 26 is disconnected. When the disconnect key 46 is operated, an "end request command", which requests for termination of the telephone communication (i.e., disconnect of the telephone line 26), is transmitted to the main apparatus 1*a* (S47).

When the disconnect key is not operated (S46: NO) the CPU 30 determines whether the call mode switching key 45 is depressed (s48). The call mode switching key 45 is a key which is operated to request for a transmission mode during the extension communication. When the call mode switching key 45 is operated (S48: YES), a "transmission right request command" to request for the transmitting status is transmitted to the main apparatus 1*a* (S49).

When the call mode switching key 45 is not operated (S48: NO), the CPU 30 determines whether the left cursor key 60 or right cursor key 61 is depressed (S50). When the left cursor key 60 or right cursor key 61 is depressed (s50: YES), a timeout notification volume switching procedure (described later) is executed (S51).

When neither of the left cursor key 60 and the right cursor key 61 are operated (S50: NO), the CPU 30 determines whether the outside line key 44 is depressed (S52). The outside line key 44 is operated when the connection between the main apparatus 1*a* with the outside line apparatus is held by the operation of the main apparatus 1*a*, and the user of the cordless handset 1*b* intends to release the holding condition and to start communicating with the outside line apparatus. When the outside line key 44 is operated (S52: YES), an "outside line request command" which requests for the communication with the outside line apparatus is transmitted to the main apparatus 1*a* (S53).

When other key operation is performed (S46: NO, S48: NO, S50: NO and S52: NO), since the communication status of the cordless handset 1*b* is not changed, no command is transmitted to the main apparatus 1*a*, and control returns to S41.

When the user of the cordless handset 1*b* operates the extension key 62 in order to perform the extension communication with the cordless handset 1*c*, the user of the cordless handset 1*b* keep operating the call mode switching key 45 in order to continue the communication. With this operation of the call mode switching key 45, the timeout timer is reset, and the transmission right request command is transmitted to the main apparatus 1*a*.

Figure 5:
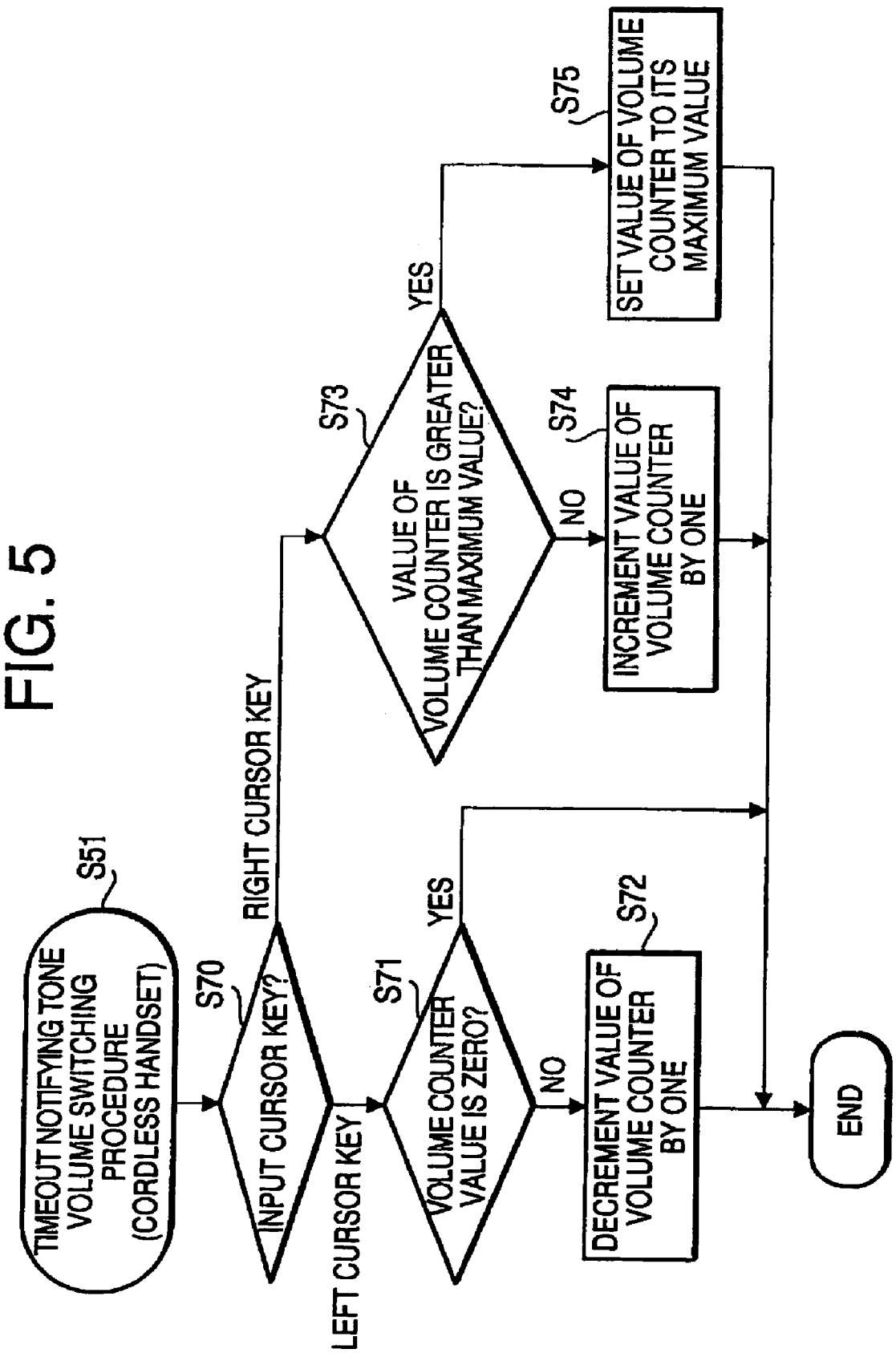
FIG. 5 shows a flowchart illustrating a timeout procedure executed by the CPU of the cordless handset.

FIG. 5 shows a flowchart illustrating a timeout notification volume switching procedure (hereinafter, simply referred to as a volume switching procedure). The volume switching procedure is for adjusting the volume of the notification sound output in a timeout notifying procedure described later. The flowchart shown in FIG. 5 is executed by the CPU 30 of the cordless handset 1*b* (1*c*), which is called in S51 of the flowchart shown in FIGS. 4A and 4B.

When the volume switching procedure is started, in S70, the CPU 30 determines whether the operated key is the left cursor key 60 or the right cursor key 61. The left cursor key 60 is used for turning down the volume, while the right cursor key 61 is used for turning up the volume. When the operated key is the left cursor key 60, control proceeds to S71, where the CPU 30 determines whether the value of a volume counter 39*a* stored in the EEPROM 39 is zero. When the value of the volume counter 39*a* is not zero (S71: NO), the CPU 30 decreases the value of the volume counter 39*a* by one (S72). When the value of the volume counter 39*a* is zero (S71: YES), the CPU 30 skips S71 since the volume cannot be turned down any more, and procedure shown in FIG. 5 is terminated.

When the right cursor key 61 is operated, control proceeds to S73, where the CPU 30 determines whether the value of the volume counter 39*a* is equal to or greater than the maximum value. When the value of the volume counter 39*a* is less than the maximum value (S73: NO), the CPU 30 increments the value of the volume counter 39*a* by one (S74). When the value of the volume counter 39*a* is equal to or greater than the maximum value (S73: YES), the CPU 30 sets the maximum value to the volume counter 39*a* (S75). Then, the procedure shown in FIG. 5 is finished.

In S75, the maximum value is set to the volume counter 39*a* in order to prevent the value of the volume counter 39*a* from being increased.

Returning back to the cordless handset side monitoring procedure shown in FIGS. 4A and 4B, when the cordless handset 1b has not been operated (S44: NO), the CPU 30 determines whether the value of the timeout timer exceeds a predetermined timeout value (threshold value) in S54. When the value of the timeout timer is less than the predetermined timeout value (S54: NO), control returns to S41. When the value of the timeout timer exceeds the timeout value (S54: YES), the CPU 30 determines that no operation has been done in the cordless handset 1b for a predetermined time period. In this case, the CPU 30 transmits a "disconnection command" to the main apparatus 1a to executes a notification procedure (S69) in S55. This occurs, for example, when the extension communication has been started between the cordless handsets 1b and 1c but neither of the cordless handsets 1b and 1c have been operated for the predetermined period (and the value of the timeout timer exceeds the predetermined timeout value).

In the cordless handset side monitoring procedure (S40-S55), a command is transmitted from the cordless handset 1b. The transmitted command is checked in the main apparatus side monitoring procedure in step S12 onwards.

Back to the main apparatus side monitoring procedure shown in FIG. 3, when the command transmitted from the cordless handset 1b is the "transmission right request command" (S12: YES), the CPU 11 determines whether the command is transmitted by the cordless handset 1b or 1c (S13). When the command is transmitted from the cordless handset 1b, which means that the user of the cordless handset 1b wants to be in the transmitting status, the CPU 11 transmits the command for setting the cordless handset 1b to the transmission mode to both the cordless handsets 1b and 1c (S14). When the command is transmitted from the cordless handset 1c, which means that the user of the cordless handset 1c wants to be in the transmitting status, the CPU 11 transmits the command for setting the cordless handset 1c to the transmission mode to both the cordless handsets 1b and 1c (S15). Then, the entire telephone equipment is brought into an extension communication mode, which is a mode in which the cordless handsets 1b and 1c performs transmission/reception of audio communication.

When the received command is the "termination request command" (S12: NO; S20: YES), then the cordless handset instructs to cut the connection to the outside line apparatus through the telephone line 26. In this case, the CPU 11 transmits a "termination command" representing that a replay is sent in response to the "termination request command", cuts the connection with the outside line apparatus and the telephone equipment is brought into the holding state (S22).

When the received command is the "outside line request command" (S20; NO; S23: YES), the CPU 11 transmits an "outside line instruction command" to the cordless handset that has transmitted the command, and establishes the connection with respect to the outside line apparatus. Then, the connection of the cordless handset with respect to the other cordless handset is cut (S24), and the main apparatus 1a is brought into the outside line communication mode (S25). It should be noted that the outside line communication mode is a mode where a communication is performed between one of the cordless handsets 1b and 1c and the outside line apparatus.

When the received command is not the "outside line request command" (S23: NO), the CPU 11 determines whether the "disconnect command" is received from the cordless handset 1b or 1c (S26). When the received command is not the "disconnect command" (S26: NO), a procedure corresponding to the received command is executed (S29), and control returns to S11. When the "disconnect command" has been received (S26: YES), the CPU 11 transmits a "notification procedure command" to both the cordless handsets 1b and 1c (S27). Thereafter, the CPU 11 sets both the cordless handsets 1b and 1c to holding state (s28). The "notification procedure command" is a command instructing the cordless handset to execute the notification using sound. When the cordless handsets 1b and 1c are set to the holding status, the status is displayed on the LCD 38. After setting the cordless handsets to the holding status, the main apparatus side monitoring procedure is finished.

When not command is received from the cordless handset 1b or 1c (S11: NO), the CPU 11 determines whether electromagnetic wave is transmitted from the cordless handset 11b or 11c (S30). When the electromagnetic wave is not transmitted from the cordless handset 1b or 1c (S30: NO), an operation for connecting the cordless handsets 1b and 1c will be executed in S31. A status where the cordless handset 1b and 1c are not connected may include a case where the command transmission cannot be performed as the cordless handset 1b (1c) are outside the communicative range with respect to the main apparatus 1a. In such a case, it is necessary to re-establish the connection, and the re-connection operation is executed. When the re-connection procedure is performed, the communication with respect to the outside line apparatus is remained in the holding status.

When the electromagnetic waves are transmitted from the cordless handsets 1b and 1c (i.e., the connection between the main apparatus 1a and the cordless handsets 1b and 1c has been established) (S30: YES), the CPU 11 determines whether the polling monitoring timer 13b overflows (S32). When the polling monitoring timer 13b does not overflow (S32: NO), process returns to S11 to keep monitoring the cordless handsets 1b and 1c. When the polling monitoring timer 13b overflows (S32: YES), the CPU 11 transmits a "notification procedure command" to both the cordless handsets 1b and 1c (S33).

The notification procedure is for notifying a user of the cordless handset of a situation where outside line is held for a relatively long period as the extension communication takes a relatively long period. Such a situation may occur when, for example, the cordless handset 1b calls the cordless handset 1c to start the extension communication, and none of the cordless handsets 1b and 1c instructs the connection to the outside line, or the extension communication takes a long period and none of the cordless handsets 1b and 1c can connect to the outside line. The notification procedure executed in the cordless handset 1b or 1c will be described later. When the notification procedure command is transmitted, process returns to S11.

As described above, from the main apparatus 1a, various commands are transmitted to the cordless handsets 1b and 1c in response to the commands transmitted from the cordless handsets 1b and 1c during the cordless handset side monitoring procedure. Further, the main apparatus 1a transmits the notification procedure command depending on the count value of the polling monitoring timer 13b provided to the main apparatus 1a.

Now, the description on the cordless handset side monitoring procedure shown in FIGS. 4A and 4B will be continued. In the following description, procedures of the cordless handset 1b when various commands transmitted from the main apparatus 1a are received will be described.

When the cordless handset 1b receives a command from the main apparatus 1a (S41: YES), the CPU 30 determines the type of the received command. When the received command is an "end command" (s60: YES), the CPU 30 determines that the received command is a reply from the main apparatus 1a with respect to the "end request command" transmitted from the cordless handset 1b by operating the disconnect key 46. In this case, the cordless handsets 1b and 1c are brought to be in a standby state (S61).

When the received command is a "communication mode command to another station" (S62: YES), the CPU 30 sets the operation mode of the cordless handset 1b to a reception mode (s63) since the opponent of the extension communication wishes the speech transmission mode and the cordless handset 1b should be set to operate in the speech receiving mode.

When the received command is a "self-designating speech transmission mode command" (S64: YES), the extension communication (speech transmission) from the cordless handset 1b is allowed. In this case, therefore, the CPU 30 sets the operation mode of the cordless handset 1b to the speech transmission mode (S65). When the received command is an "outside line designating command" (S66: YES), the CPU 30 determines that the main apparatus 1a has replied to the "outside line request command" transmitted from the cordless handset 1b as the outside line key 44 was operated. In such a case, the CPU 30 sets the cordless handset 1b to operate in an outside line communication mode (S67) in order to start the communication between the cordless handset and the outside line apparatus that is connected through the telephone line 26.

Figure 6:
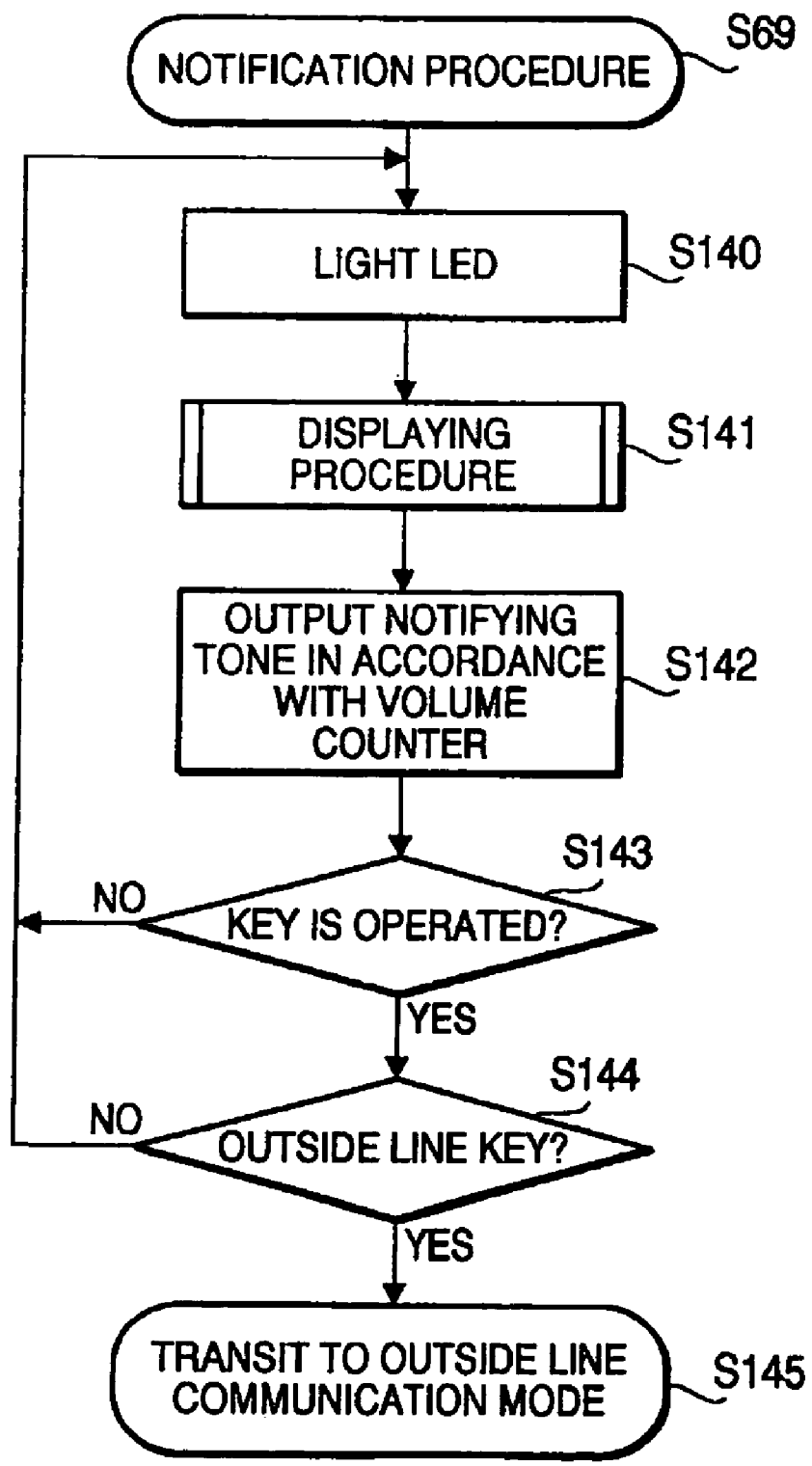
FIG. 6 shows a flowchart illustrating a notification procedure executed by the CPU of the cordless handset.

When the received command is the "notification procedure command" (S68: YES), a notification procedure illustrated in FIG. 6 is executed (S69), and process returns to S41. When other commands are received (S60: NO; S62: NO; S64: NO; S66: NO; and S68: NO), no particular procedure is executed, and process returns to S41.

Thus, for example, when the user of the cordless handset 1c operates the call mode switching key 45 in order to reply to the call from the cordless handset 1b, the "speech transmission right request command" is transmitted to the main apparatus 1a. Then, the main apparatus 1a recognizes that the request is from the cordless handset 1c, and transmits the command for setting the cordless handset 1c to the speech mode to both the cordless handsets 1b and 1c. With the above procedure, it becomes possible for the user of the cordless handset 1c to transmit the speech. When the user of the cordless handset 1c operates the outside line key 44 to communicate with the outside line apparatus which is being held, the "outside line request command" is transmitted to the main apparatus 1a. Then, the main apparatus 1a recognizes that the cordless handset 1c requests for the outside line connection, and transmits the "outside line designation command" to the cordless handset 1c. As a result, the cordless handset 1c can communicate with the outside line apparatus. When the extension key 62 is operated but no extension communication has been made and the cordless handset 1c has not been operated, the holding condition of the outside line apparatus is kept for a long period. According to the embodiment, since the notification procedure is executed, the users of the cordless handsets 1b and 1c recognize such a situation.

Next, the notification procedure that is executed in S69 (FIGS. 4A and 4B) will be described. the notification procedure is executed by the CPU 30 of each of the cordless handset 1b and 1c. As aforementioned, the notification procedure is executed when the polling monitoring timer 13b overflows, or when a timeout is detected in the procedure executed by the cordless handset 1b or 1c. The notification procedure is for notifying the users of the cordless handset 1b and 1c of a condition where the outside line is held for a predetermined period, and letting the user to start the communication with the outside line apparatus through the telephone line 26.

When the CPU 30 is instructed to execute the notification procedure (S69), the CPU 30 lights the LEDs of the cordless handset 1b (1c) in S140. In S141, an image displaying procedure is executed. The LEDs are for illuminating the keys of the cordless handset 1b, and in S141, at least the LED for illuminating the outside line key 44 is lit to request the user to operate the outside line key 44. In the image displaying procedure in S144, the CPU 30 displays information indicating that the holding status of the outside line is kept for a predetermined period on the LCD 38, and displays a message asking the user to operate the outside line key 44. As above, the user is informed, without fail, of the status that the outside line has been held for a relatively long period with an audible effect using a sound and a visual effect using light and message.

When the LED is lit (S140) and the information (message) is displayed on the LCD 38 (S141), the CPU 30 outputs a notifying sound, which is different from the calling tone, in accordance with the value set in the volume counter 39a (S142) to notify the user of the cordless handset 1b (1c) that the connection between the main apparatus 1a and the outside line apparatus is held.

In S143, the CPU 30 determines whether a key operation has been made by the user, and until the user operates a key (S143: NO), the sound/audio notification in steps S140 through S142 are repeated. When a key was operated by the user (S143: YES), the CPU 30 determines whether the operated key is the outside line key 44 (S144). When the operated key is not the outside line key (S144: NO), process returns to S140, and steps S140 through S142 are repeated until the outside line key 44 is operated. When the operated key is the outside line key 44 (S144: YES), the CPU 30 sets the operation mode of the cordless handset 1b to the outside line communication mode to allow the communication between the cordless handset 1b and the outside line apparatus, and terminates the procedure shown in FIG. 6. It should be noted that, according to the embodiment, since the notifying sound is different from the normal ringing tone, the user of the cordless handset 1b can easily recognize whether the sound is the ringing tone or the notifying tone.

Incidentally, when the notification procedure shown in FIG. 6 is started, the audio/visual notification is repeatedly executed until the outside line key 44 is operated. In the main apparatus 1a, in such a case, when the outside line key 44 has not been operated more than a predetermined time period at the cordless handset side, the CPU 11 of the main apparatus 1a executes an answering phone procedure, which is similar to a procedure in S105 of FIG. 7 (described later), as a timeout procedure. When the timeout procedure is executed and the answering phone procedure is initiated in the main apparatus 1a, the notification in steps S140 through S142 is stopped and the notification procedure in the cordless handset 1b (FIG. 6) is terminated.

Figure 7:
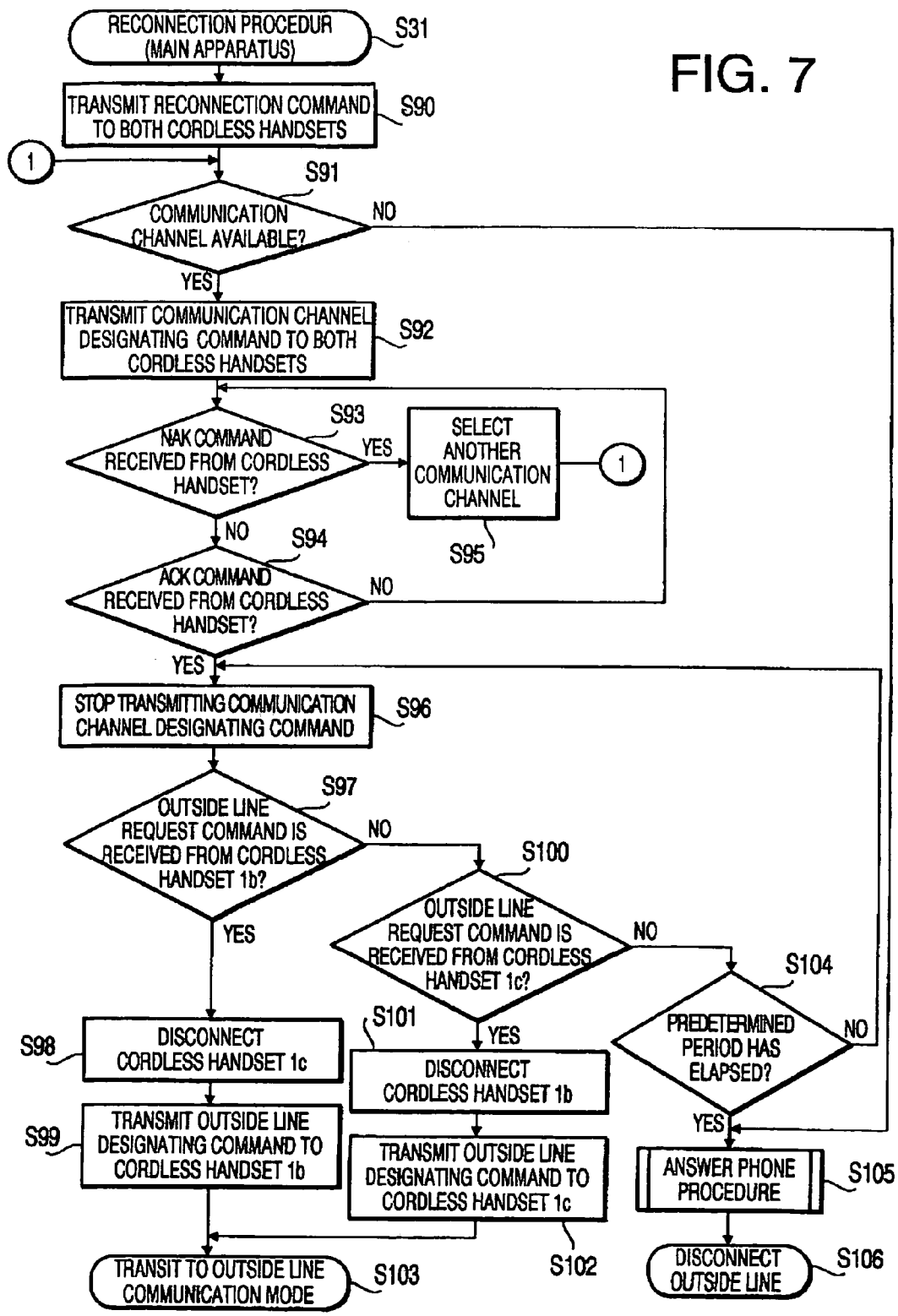
FIG. 7 shows a flowchart illustrating a re-connection procedure executed by the CPU of the main apparatus.
Figure 8:
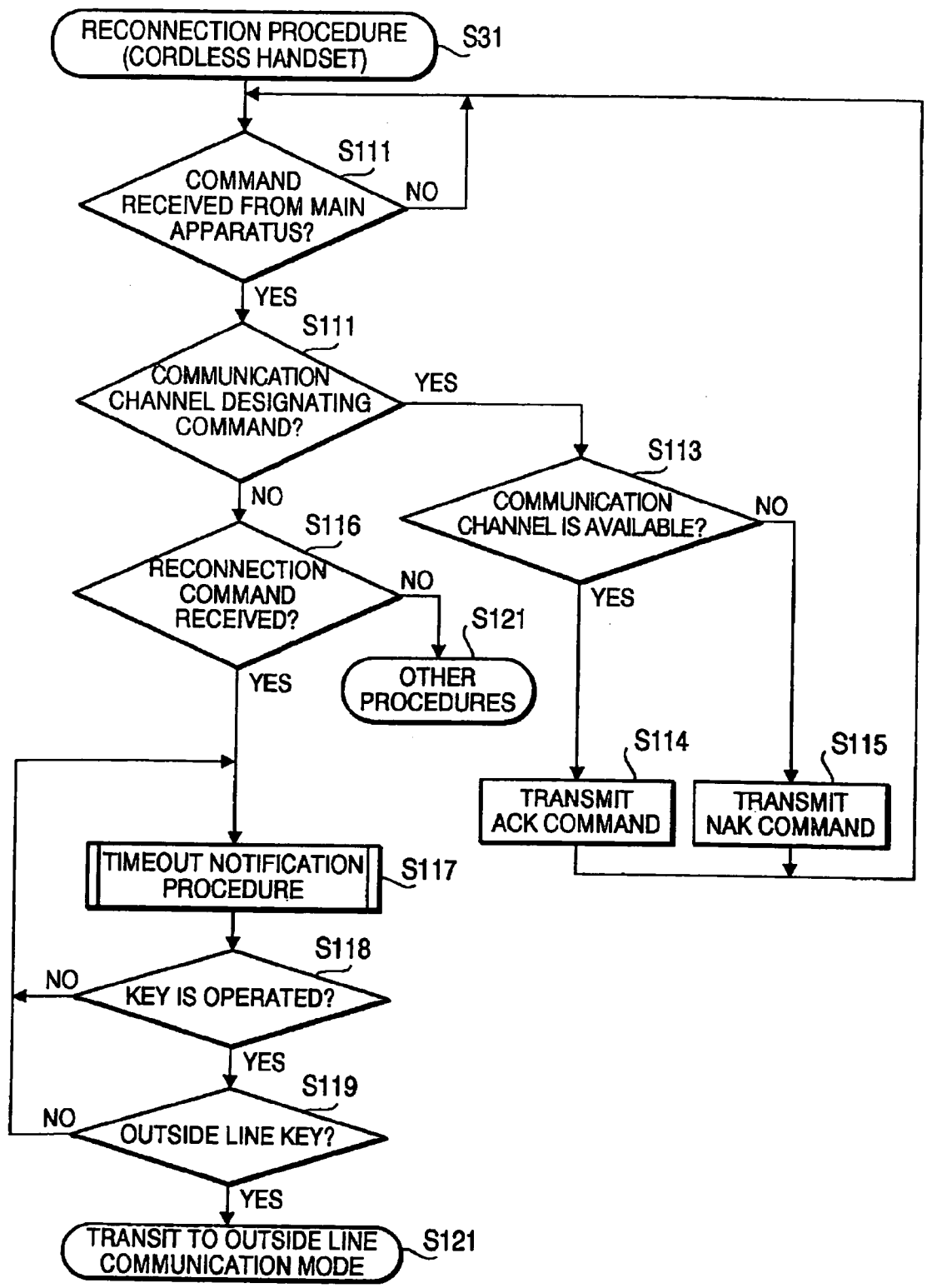
FIG. 8 shows a flowchart illustrating a re-connection procedure executed by the CPU of the cordless handset.

Next, referring to FIGS. 7 and 8, a procedure for re-connecting the cordless handsets 1b and 1c (S31 of FIG. 3) is described. Specifically, FIG. 7 is a flowchart illustrating a re-connecting procedure executed by the CPU 11 of the main apparatus 1a, and FIG. 8 is a flowchart illustrating a re-connecting procedure executed by the CPU 30 of the cordless handsets 1b and 1c.

When the re-connection procedure shown in FIG. 7 is started, the CPU 11 of the main apparatus 1a transmits a "re-connection command" to each of the cordless handsets 1*b* and 1*c* (S90). Then, the CPU 11 determines whether communication channels through which the main apparatus 1*a* can communicates with the cordless handsets 1*b* and 1*c* (S91). When the communication channels are available (S91: YES), the CPU 11 transmits a "communication channel designating command" to each of the cordless handsets 1*b* and 1*c* to designate the available communication channel to be used for communication between the main apparatus 1*a* and each of the cordless handsets 1*b* and 1*c* (S92). After the execution of S92, the CPU 11 repeats steps S93 and S94 until an "NAK command" or "ACK command" is received.

When the "NAK command" is received (S93: YES), the CPU 11 determines that the channel designated with the "communication channel designating command" is unavailable (i.e., cannot be used for communication), the CPU 11 designates another communication channel (S95). Then, process returns to S91. Until the available communication channel is designated, the "communication channel designating command" designating different communication channel is repeatedly transmitted.

When the "ACK command" is received (S94: YES), the designated communication channels are available for communication, and process proceeds to S96.

When all the communication channels are unavailable (S91: NO), the communication between outside line apparatus and one of the cordless handsets 1*b* and 1*c* cannot be established. In this case, the CPU 11 executes the answer phone procedure (S105), in which a message is transmitted to the outside line apparatus and change the operation mode of the main apparatus 1*a* to a mode for recording incoming messages from the outside line apparatus. Thereafter, when a predetermined time period has passed, the CPU 11 disconnects the outside line (S106).

With the above procedure, the user of the outside apparatus, which is connected with the main apparatus 1*a* through the telephone line 26, will not be held for a long time until the holding status is released. Since the user of the outside apparatus can leave a message (i.e., the message is stored in S105), he/she need not make a telephone call again and would not have discomfort feeling.

As the communication channels to be used are designated, transmission of the "communication channel designating command" is stopped in S96. Then, the CPU 11 determines in which cordless handset the outside line key 44 has been depressed (S97 and S100). When the outside line key 44 of the cordless handset 1*b* has been depressed, the "outside line request command" is received from the cordless handset 1*b* (S97: YES). In this case, the CPU 11 disconnects the connection with the cordless handset 1*c* (S98), and transmits the "outside line designating command" to the cordless handset 1*b* (S99). When the outside line key 44 of the cordless handset 1*c* has been depressed, the "outside line request command" is received from the cordless handset 1*c* (S100: YES). In this case, the CPU 11 disconnects the connection with the cordless handset 1*b* (S101), and transmits the "outside line designating command" to the cordless handset 1*c* (S102). After the execution of S99 or S102, the CPU 11 changes the operation mode to the outside line communication mode (S103).

After the transmission of the "communication channel designating command" is stopped in S96, the CPU 11 determines whether the "outside line request command" is received from the cordless handset 1*b* or 1*c* within a predetermined time period (S97: NO; S100: NO; S104: NO). When the CPU 11 determines that the predetermined period has passed (S104: YES) without receiving the "outside line request command", it becomes impossible that neither of the cordless handsets 1*b* and 1*c* can communicate with the outside apparatus. In this case, similarly to the above-described procedure, the answer phone procedure is executed in S105, and then disconnects the outside line in S106.

Next, a re-connection procedure executed in the cordless handset 1*b* (i.e., the CPU 30) will be described with reference to the flowchart shown in FIG. 8.

When the re-connection procedure is started, the CPU 30 determines whether a command is received from the main apparatus 1*a* (S111). Process repeats S111 until the command is received from the main apparatus 1*a* (S111: NO). When the command is received (S111: YES), the CPU 30 determines whether the received command is the "communication channel designating command" that designates the communication channel to be used (S112). When the received command is the "communication channel designating command" (S111: YES), the CPU 30 further determines whether the communication channel designated by the "communication channel designating command" is available (S113). When the designated channel is not available (S113: NO), the CPU 30 transmits an "NAK command" to the main apparatus 1*a* (S115). When the designated channel is available (S113: YES), the CPU 30 transmits the "ACK command" to the main apparatus (S114). After the execution of S114 or S115, process returns to S111. While the "communication channel designating command" is being received (S112: YES), process repeats steps S111-S115. It should be noted that the "NAK command" and "ACK command" are not for instruction some operation, but only for replaying to the commands transmitted from the main apparatus 1*a*.

When there is an available communication channel and the CPU 30 transmits the "ACK command" to the main apparatus 1*a* (S114), transmission of the "communication channel designating command" from the main apparatus 1*a* is stopped as step S96 is executed in the main apparatus 1*a* (S112: NO). Then, in S116, the CPU 30 determines whether the received command is the "re-connection command". When the "re-connection command" is received (S116: YES), the timeout notifying procedure is executed in S117. When the received command is not the "re-connection command" (S116: NO), it is determined that the end of the re-connection procedure has been transmitted from the main apparatus 1*a*. Therefore, in this case, the CPU 30 terminates the re-connection procedure, and executes other procedures (S121), which may include a procedure for monitoring transition of the operating status of the cordless handset 1*b* (1*c*) from the standby state to another state as it is operated.

Figure 9:
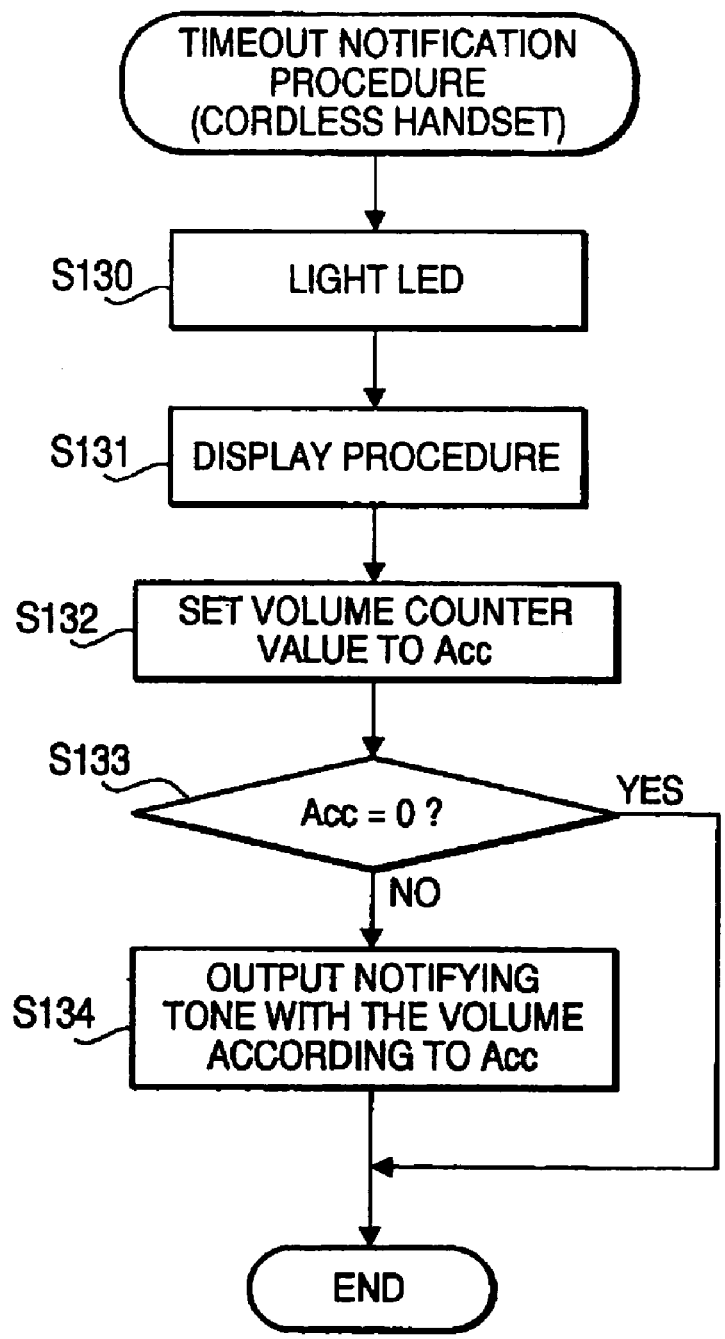
FIG. 9 shows a flowchart illustrating a timeout notification procedure executed by the CPU of the cordless handset.

FIG. 9 shows a flowchart illustrating the timeout notifying procedure executed by the CPU 30 of the cordless handset 1*b* or 1*c*. The timeout notifying procedure is executed when the connection between the outside apparatus and the main apparatus 1*a* is held, the cordless handsets 1*b* and 1*c* have not been operated for more than a predetermined period, and the main apparatus 1*a* is re-connected with the cordless handsets 1*b* and 1*c*. When the timeout notifying procedure is executed, a notifying tone is output by the cordless handsets 1*b* and 1*c*.

When the timeout notifying procedure is instructed in S117, the CPU 30 lights the LEDs of the cordless handsets 1*b* and 1*c* in S130. In S131, an image displaying procedure is executed. The LEDs are for illuminating the keys of the cordless handset 1*b*, and in S131, at least the LED for illuminating the outside line key 44 is lit to request the user to operate the outside line key 44. In the image displaying procedure in S131, the CPU 30 displays information indicating that the holding status of the outside line is kept for a predetermined period on the LCD 38, and displays a message asking the user to operate the outside line key 44. As above, the user is informed, without fail, of the status that the outside line has been held for a relatively long period with an audible effect using a sound and a visual effect using light and message.

When the LED is lit (S130) and the information (message) is displayed on the LCD 38 (S131), the CPU 30 sets the value set in the volume counter 39a to a variable Acc (S132). In S133, the CPU 30 determines whether Acc is equal to zero (i.e., whether the volume is zero). When Acc is equal to zero (S133: YES), the procedure shown in FIG. 9 is finished. Since the volume is set to zero, it is unnecessary to perform an operation to output the notifying tone. When Acc is not equal to zero (S133: NO), the CPU 30 outputs the notifying tone, which is different from the calling tone, in accordance with the value set to Acc (S134) to notify the user of the cordless handset 1b (1c) that the connection between the main apparatus 1a and the outside line apparatus is held. It should be noted that, according to the embodiment, the notifying sound is different from the normal ringing tone, accordingly, the user of the cordless handset 1b can easily recognize whether the sound is the ringing tone or the notifying tone.

Returning to FIG. 8, when the timeout notifying procedure in S117 is finished, the CPU 30 determines whether there is a key input (S118). When no keys have been operated (S118: NO), process returns to S117 to repeat the timeout notifying procedure. When a key is operated (S118: YES), the CPU 30 determines whether the operated key is the outside line key 44 (S119). When the operated key is not the outside line key 44 (S119: NO), process returns to S117, and steps S117-S119 are repeated until the outside line key 44 is operated.

When the operated key is the outside line key 44 (s119: YES), the CPU 30 transmits the "outside line request command" to the main apparatus 1a, changes the operation mode of the cordless handset 1b (1c) to the outside line communication mode (S120), and terminates the re-connection procedure shown in FIG. 8.

As described in detail above, according to the telephone equipment 1, when the connection between the outside apparatus (e.g., the outside line apparatus) and the main apparatus 1a is held, the extension communication is performed between the cordless handsets 1b and 1c, and the cordless handsets 1b and 1c are not operated more than a predetermined time period, the notifying sound it output in the cordless handsets performing the extension communication to notify that the connection of the outside line is held. With this configuration, the user can recognize the connection to the outside line has been held, thereby the holding status will not continue for a relatively long period. Further, the notification is made not only by the sound, but also by the visual output (e.g., light and/or message). Therefore, the condition can be recognized by the users without fail.

Further, when there is no currently available electromagnetic wave transmitted from the cordless handsets 1b and 1c, the available communication channels are selected, and the notification is made after the re-connection between the main apparatus 1a and one of the cordless handset is established. Accordingly, when the notification is made, it is confirmed that the communication between the outside apparatus and the cordless handset 1b (1c) can be performed. Furthermore, if no communication channel to be used is available, the main apparatus is set to a mode for storing the incoming messages from the outside apparatus. Therefore, there is no need for the outside line apparatus to call the main apparatus 1a again and again. Thus, the user of the outside apparatus would not have a bad feeing since it is unnecessary to make a telephone call to the main apparatus 1a again.

Hereinafter, telephone equipment 1M according to a second embodiment will be described.

In the first embodiment described above, when the extension communication is performed with the outside line being held and the cordless handsets 1b and 1c have not been operated for a predetermined time period (i.e., when the timeout is detected), the "disconnection command" is transmitted from the cordless handset to the main apparatus 1a. Thereafter, when the cordless handset receives the notification procedure command from the main apparatus 1a, the timeout notification procedure is started. According to the second embodiment, the timeout notification procedure is executed, when the timeout is detected, on the cordless handset side.

Figure 10:
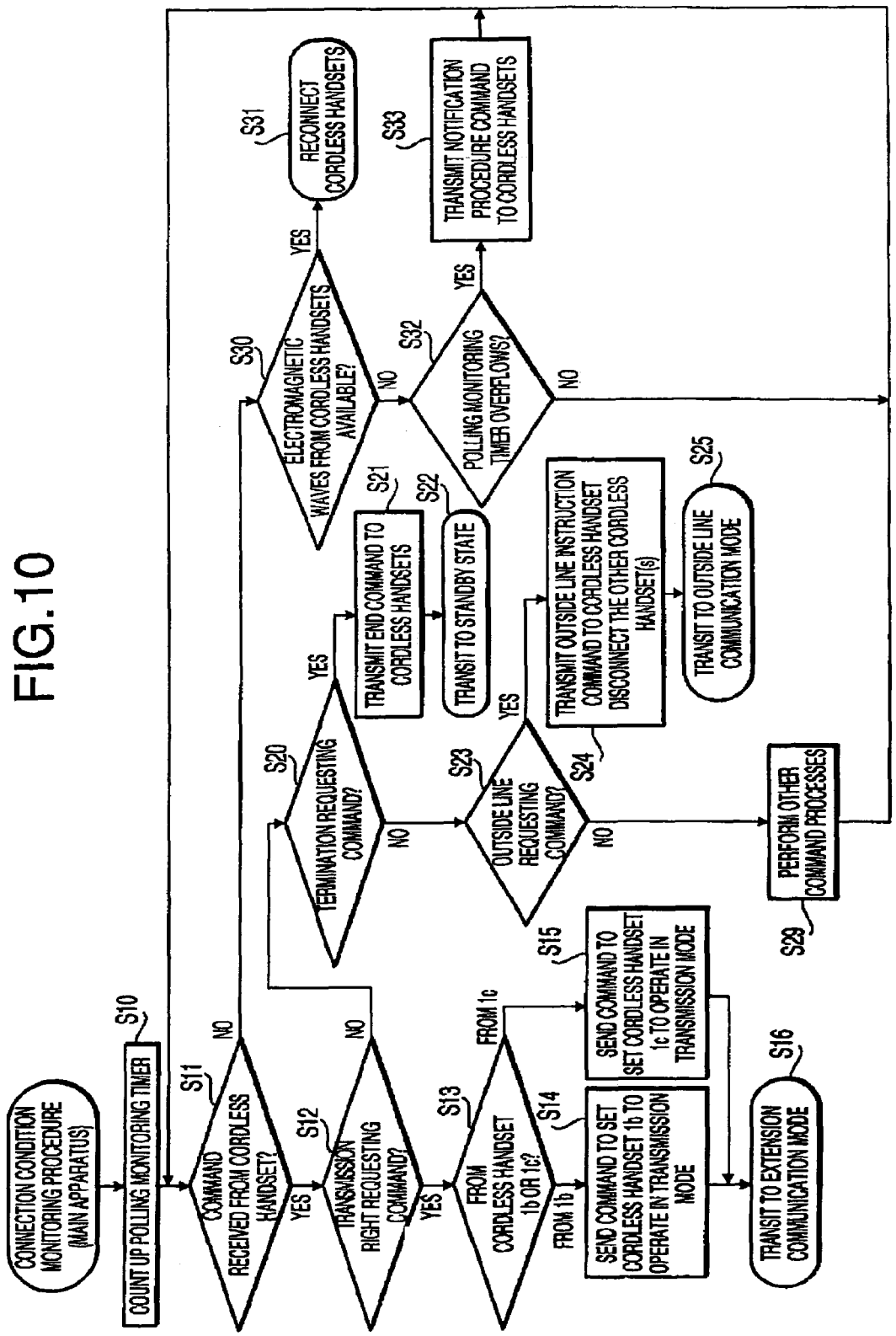
FIG. 10 shows a flowchart illustrating a main apparatus side connection monitoring procedure executed by the CPU of the main apparatus, according to a second embodiment of the invention.
Figure 11A:
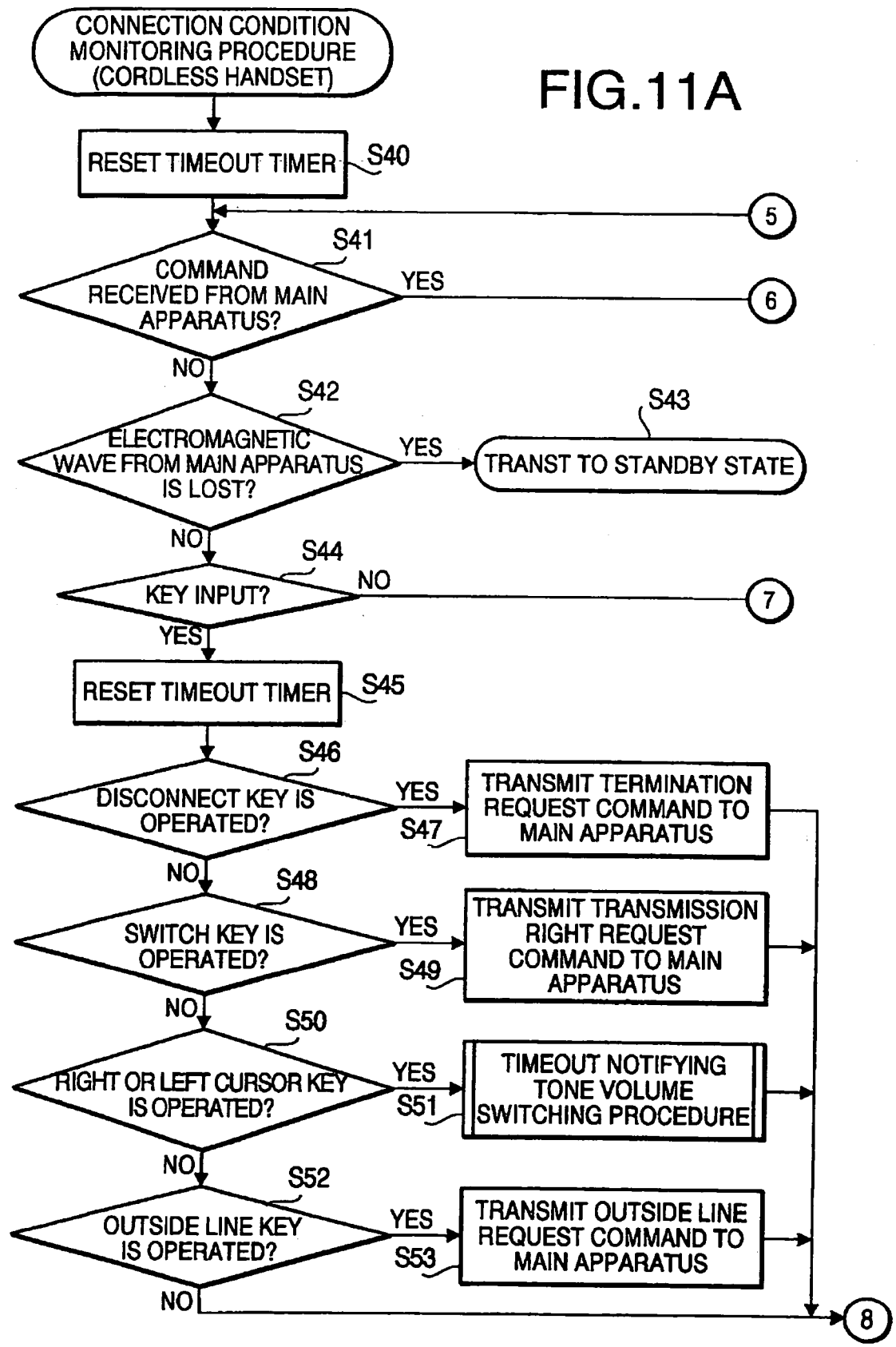
FIGS. 11A and 11B show a flowchart illustrating a cordless handset side connection monitoring procedure executed by a CPU of the cordless handset, according to the second embodiment.
Figure 11B:
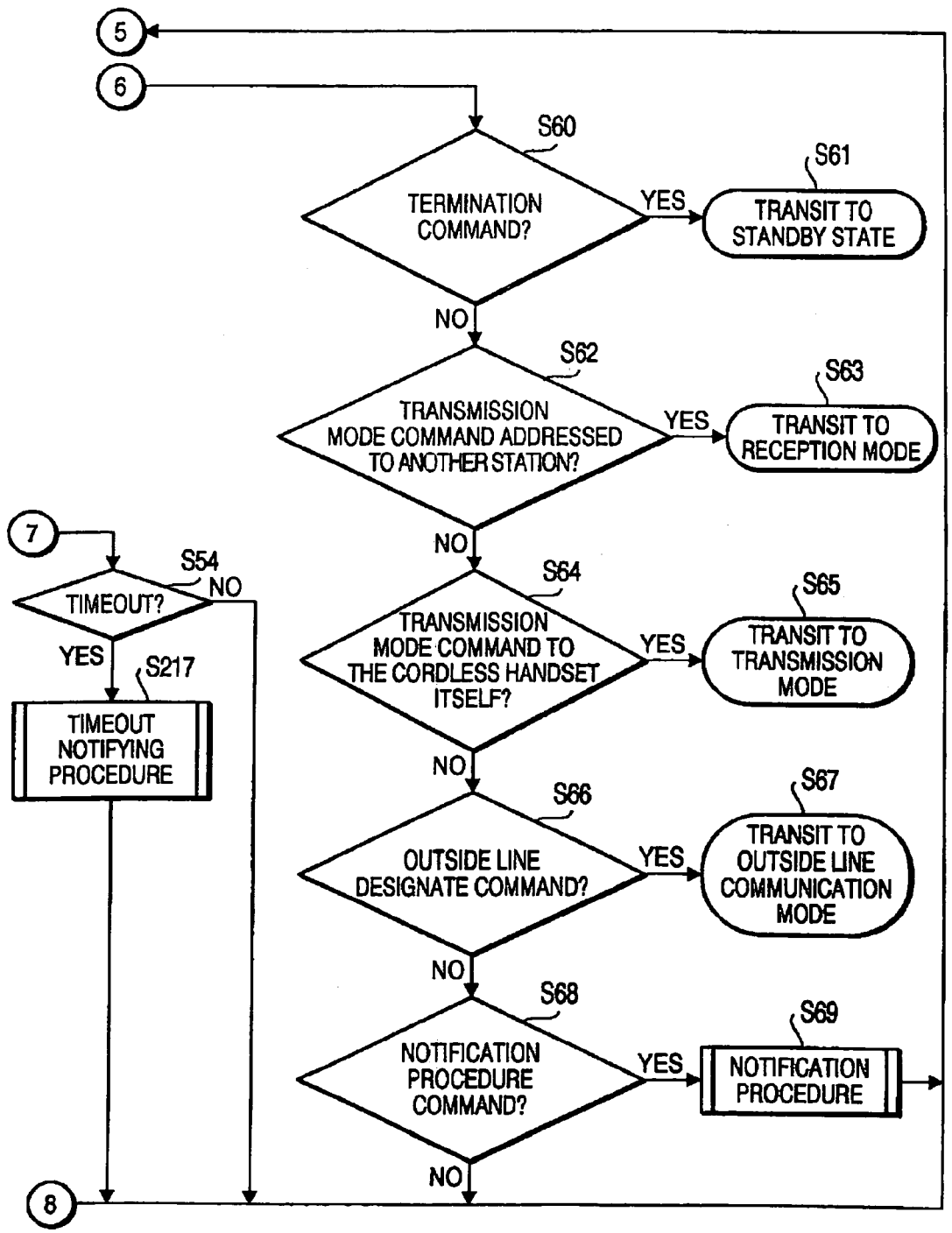
Figure 12:
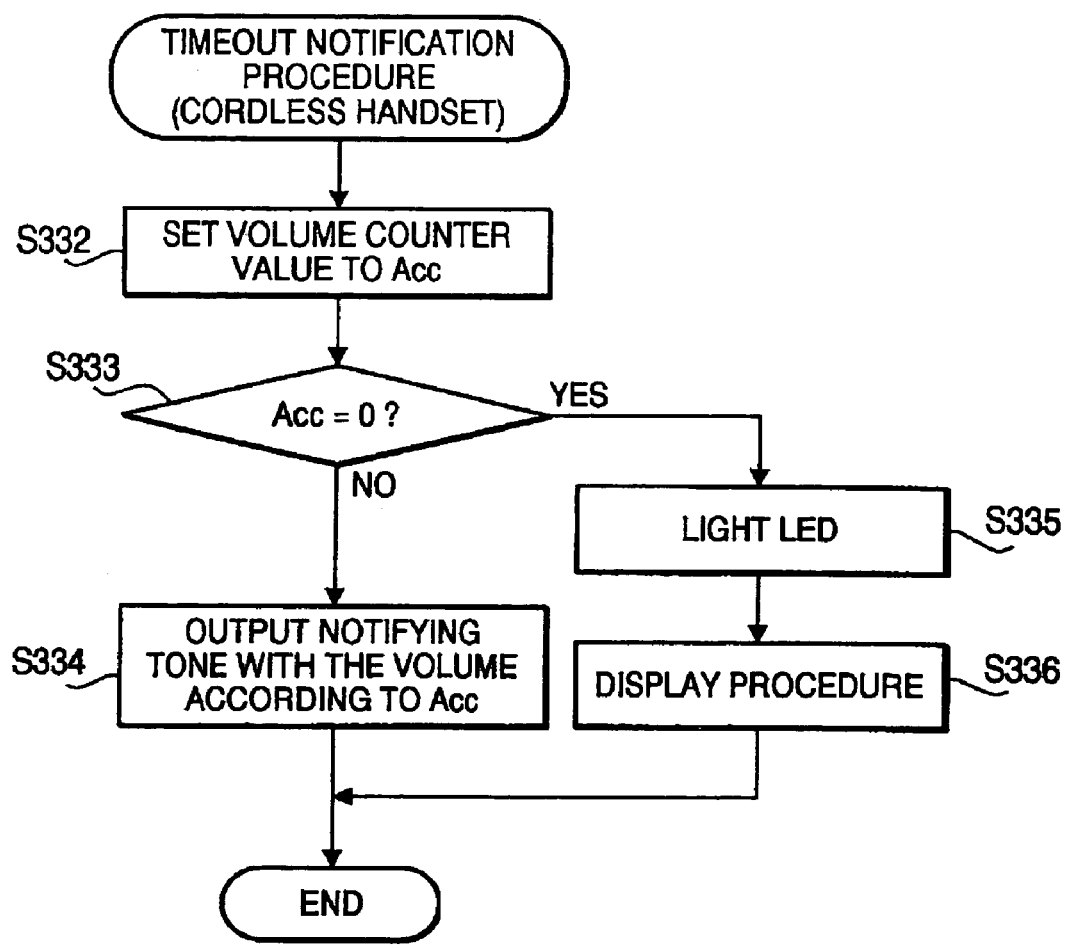
FIG. 12 shows a flowchart illustrating a timeout notification procedure executed by the CPU of the cordless handset according to a modification of the embodiments.

Hereinafter, the second embodiment will be described with reference to FIGS. 10-12. FIG. 10 shows a flowchart illustrating a main apparatus side connection monitoring procedure executed by the CPU 11 of the main apparatus 1a, according to a second embodiment of the invention, FIGS. 11A and 11B show a flowchart illustrating a cordless handset side connection monitoring procedure executed by a CPU 30 of the cordless handset 1b (1c), according to the second embodiment, FIG. 12 is a flowchart illustrating a timeout notification procedure executed by the CPU 30 of the cordless handset according to the second embodiment. In the description on the second embodiment, portions similar to those described in the first embodiment are indicated with the same numbers/symbols and description thereof are omitted for the sake of brevity.

As mentioned above, the "disconnection command" is not transmitted according to the second embodiment. Therefore, the confirmation of the "disconnection command" executed in S26-S28 (FIG. 3) in the first embodiment is not included in the second embodiment (i.e., in FIG. 10). Instead, according to the second embodiment, when the "outside line requesting command" is not received (S23: NO), process executes an operation corresponding to the received command immediately (S29). The other steps in FIG. 10 are similar to those in FIG. 3, and will not be described.

In FIGS. 11A and 11B, when the CPU 30 determines the timeout status (S54: YES), instead of transmitting the "disconnection command" to the main apparatus 1a, the timeout notification procedure is executed in S217. The other steps are similar to those in FIGS. 4A and 4B.

It should be noted that the timeout notification procedure executed in S217 is similar to the procedure executed in S117 of the first embodiment, which is illustrated in FIG. 9.

In the second embodiment, similar to the first embodiment, when the holding status of the outside line has been kept for more than the predetermined period, the users of the cordless handsets 1b and 1c are notified of the status with the light of the LED and the notifying sound. Further, when the notification is made, the user of the cordless handset 1b or 1c can select the outside line communication or extension communication. If the user is required to perform only the outside line communication when the notification is made, it is inconvenient for the user particularly when the user need to perform the extension communication. According to the second embodiment, since the user can select the outside line communication or the extension communication even after the notification is made, the telephone equipment is convenient for the user. Since the notification is made, even if the user performs the extension communication prior to the outside line communication, it is expected that the holding status of the outside line will not last long.

When the timeout is detected in both the cordless handsets 1b and 1c, the timeout notification procedure is initiated in each cordless handset. In comparison with the case where the timeout notification procedure is initiated under control of the main apparatus 1a, burden to the main apparatus 1a is reduced, and operations are controlled efficiently.

It should be noted that the invention need not be limited to the above-described exemplary embodiments, and various modification can be made without departing the scope of the invention.

For example, in the embodiments, the timeout timer is reset when an operation is maid in each of the cordless handsets 1b and 1c. This can be modified such that regardless of the operation of the cordless handset, the notification is made when a predetermined period has passed since the extension communication between the cordless handsets were started.

In the embodiments described above, the re-connection procedure is executed when the electromagnetic wave is not transmitted from the cordless handsets 1b and 1c. This may be modified such that the connection between the main apparatus 1a and the cordless handsets 1b and 1c before the notifying procedure (S69) and/or the timeout notification procedure (Second embodiment: S217) are released, then re-connected, and thereafter the notification is made in each of the cordless handset 1b and 1c. With such a configuration, it is ensured that the re-connection is made before the notification is made. Accordingly, the notification is made without fail.

Further, according to the embodiments, the answering phone function is used in S105 of FIG. 6. This step may be replaced to a step for outputting a message indicating that the user is unable to respond to the telephone.

Furthermore, in the above-described embodiments, when the connection between the outside apparatus and the main apparatus has been held and the cordless handsets 1b and 1c have not been operated for more than a predetermined period, the timeout is notified without fail. This configuration of the telephone equipment may be modified such that whether notification is made or not can be switched. In such a case, the switching may be set simply by operating a switch element, or setting is made and stored in the RAM 13 of the main apparatus 1a, RAM 32 and/or EEPROM 39 of the cordless handsets 1b and 1c. If the telephone equipment is configured such that whether or not the timeout is notified can be switched, unnecessary notification can be avoided. Thus, the user can switch the setting depending on the usage environment of the telephone equipment, which enhances the operability of the telephone equipment.

In the above-described embodiments, the notification of the timeout is made using visual output, which includes lighting of the LED and displaying the image/message on the LCD 38, and audio output, which includes the output of the notifying tone. The invention need not limited to the configuration described above, and only one of the visual and audio outputs may be employed for notification. Optionally, the telephone equipment may be configured such that (a) the audio notification, (b) the visual notification and (c) the audio and visual notification may be selected.

Still optionally, the telephone equipment may be configured such that even when only the audio notification is made to notify the timeout, if the value of the volume counter 39a is set to zero, the visual notification is forcibly performed.

FIG. 12 shows a flowchart illustrating such a modification of the timeout notifying procedure executed by the CPU 30 of the cordless handset 1b or 1c.

When the timeout notifying procedure is instructed (e.g., in S117 or S217), the CPU 30 sets the value set in the volume counter 39a to a variable Acc (S332). In S333, the CPU 30 determines whether Acc is equal to zero (i.e., whether the volume is zero). When Acc is not equal to zero (S333: NO), the CPU 30 outputs the notifying tone, which is different from the calling tone, in accordance with the value set to Acc (S334) to notify the user of the cordless handset 1b (1c) that the connection between the main apparatus 1a and the outside line apparatus is held. When Acc is equal to zero (S333: YES), the CPU 30 lights the LEDs of the cordless handsets 1b and 1c in S335. Further, in S336, an image displaying procedure is executed. Therefore, in S335, at least the LED for illuminating the outside line key 44 is lit to request the user to operate the outside line key 44. In the image displaying procedure in S336, the CPU 30 displays information indicating that the holding status of the outside line is kept for a predetermined period on the LCD 38, and displays a message asking the user to operate the outside line key 44. As above, the user is informed, without fail, of the status that the outside line has been held for a relatively long period with a visual effect using light and message if the volume of the notifying tone is set to zero.

In the embodiments, the cordless handsets 1b and 1c perform the transceiver communication and the operation mode of each of the cordless handsets 1b and 1c is switched between the transmitting mode and receiving mode. The invention needs not be limited to the configuration above, and the cordless handsets may be configured to operate in the transmitting mode and the receiving mode simultaneously.

The present disclosure relates to the subject matter contained in Japanese Patent Application No. 2003-304273, filed on Aug. 28, 2003, which is expressly incorporated herein by reference in its entirety.

What is claimed is:

1. Telephone equipment having a main apparatus and a plurality of cordless handsets, the main apparatus being connectable with an outside apparatus through a telephone line, the plurality of cordless handsets being capable of performing an extension communication being relayed by the main apparatus, the telephone equipment comprising:

a line holding system that holds a connection between the main apparatus and the outside apparatus;

an extension communication detecting system that detects a start of the extension communication when a communication with the outside apparatus is being held;

a timer that measures a time period elapsed from the start of the extension communication; and a notification system that causes at least one of the cordless handsets performing the extension communication to perform a notifying operation when the time period measured by the timer exceeds a predetermined time period, wherein the extension communication detecting system and the timer are provided to each of the main apparatus and the plurality of cordless handsets, wherein the main apparatus includes an instructing system that instructs at least one of the cordless handsets performing the notifying operation when the time period measured by the timer provided to one of the main apparatus and the plurality of cordless handsets exceeds the predetermined time period, wherein each of the plurality of cordless handsets is configured to transmit a disconnection signal to the main apparatus, the disconnection signal requesting for disconnection from the connection with the outside apparatus when an elapsed time period measured by the timer provided to each of the plurality of cordless handsets exceeds the predetermined period, wherein the instruction system included in the main apparatus is configured to transmit an instruction in response to the disconnection signal to a cordless handset that has transmitted the disconnection signal, and wherein when the cordless handset receives the instruction from the main apparatus, the notifying system causes the cordless handset that has received the instruction to execute the notifying operation.

2. The telephone equipment according to claim 1,
wherein each of the cordless handsets is configured such that one of a communication with the outside apparatus connection which is currently held and the extension communication currently held after the notifying operation was performed.

3. The telephone equipment according to claim 2,
wherein each of the cordless handset is provided with a display system capable of displaying letters and figures, the communication with the outside apparatus and the extension communication being displayed on the display system as selectable items.

4. The telephone equipment according to claim 2,
wherein the main apparatus includes:
a setting system that sets the telephone equipment in a condition of storing an incoming message from the outside apparatus when the main apparatus receives none of the choices of the communication with the outside apparatus and the extension communication from the cordless handset in which the notifying operation has been performed, and
a disconnecting system that disconnects the connection between the main apparatus and the outside apparatus when the condition of storing the incoming message from the outside apparatus has been maintained for a predetermined storing period.

5. The telephone equipment according to claim 1, further including:
a setting system that sets the telephone equipment in a condition for storing an incoming message from the outside apparatus when a connection with the cordless handset, which has transmitted the disconnection signal to the main apparatus, cannot be established, and
a disconnecting system that disconnects the connection between the main apparatus and the outside apparatus when the condition of storing the incoming message from the outside apparatus has been maintained for a predetermined storing period.

6. The telephone equipment according to claim 1,
wherein the extension communication detecting system detects that the extension communication is started when an operation for executing the extension communication is performed in the cordless handset is detected.

7. The telephone equipment according to claim 1,
wherein the cordless handsets are configured such that a communication therebetween is performed by alternately switching an operating condition of the cordless handsets between a transmitting condition and a receiving condition, wherein the extension communication detecting system further includes a standby condition detecting system that detects a standby condition representing a condition where none of the transmitting condition and the receiving condition is selected, and wherein when one of the transmitting condition and the receiving condition is selected after the standby condition detecting system has detected the standby condition, the timer is reset so that a measured time period is cleared and the timer is set to an initial value.

8. The telephone equipment according to claim 1, further includes a switching system that enables an operation mode to be switched between a first mode in which the notifying operation is executed and a second mode in which the notifying operation is not executed.

9. The telephone equipment according to claim 1,
wherein each of the cordless handsets includes a sound output system, the notification system executing the notifying operation by outputting sound through the sound output system.

10. The telephone equipment according to claim 9,
wherein the sound output through the sound output system for notification is different from a ringing tone output through the sound output system.

11. The telephone equipment according to claim 1,
wherein each of the cordless handsets includes a lighting system, the notification system executing the notifying operation by actuating the lighting system.

12. The telephone equipment according to claim 1,
wherein each of the cordless handsets includes a displaying system, the notification system executing the notifying operation by displaying a predetennined message on displaying system.

13. The telephone equipment according to claim 1,
wherein each of the cordless handsets includes:
a sound output system for notification, an output volume of the sound output system being adjustable; and
a lighting system for notification, one of the sound output system and the lighting system being selectable for notification,
wherein when the sound output system is selected for notification and the output volume is set to its minimum value, the sound output system is not used for notification and the lighting system is used for notification.

14. A cordless handset for telephone equipment having a main apparatus and a plurality of cordless handsets, the main apparatus being connectable with an outside apparatus through a telephone line, at least two of the cordless handsets being capable of performing an extension communication therebetween being relayed by the main apparatus, the cordless handset including:
an extension communication detecting system that detects a start of the extension communication when a connection between the main apparatus and the outside apparatus is being held;
a timer that measures a time period elapsed from the start of the extension communication; and
a notification system that performs a notifying operation when the time period measured by the timer exceeds a predetermined time period,
wherein a detecting system and the timer are provided to each of the cordless handsets and the plurality of cordless handsets,
wherein the main apparatus includes an instructing system that instructs at least one of the cordless handsets performing the notifying operation when the time period measured by the timer provided to one of the main apparatus and the plurality of cordless handsets exceeds the predetermined time period, wherein each of the plurality of cordless handsets is configured to transmit a disconnection signal to the main apparatus, the disconnection signal requesting for disconnection from the connection with the outside apparatus when an elapsed time period measured by the timer provided to each of the plurality of cordless handsets exceeds the predetermined period, wherein the instruction system in the main apparatus is configured to transmit an instruction in response to the disconnection signal to a cordless handset that has transmitted the disconnection signal, and wherein; when the cordless handset receives the instruction from the main apparatus, the notifying system causes the cordless handset that has received the instruction to execute the notifying operation.

15. A program product containing computer executable instructions that control a telephone equipment having a main apparatus and at least two cordless handsets, the main apparatus being connectable with an outside apparatus through a telephone line, the at least two cordless handsets being capable of performing an extension communication through the main apparatus, the instructions causes the telephone equipment to include functions of:

a line holding system that holds a connection between the main apparatus and the outside apparatus;

an extension communication detecting system that detects a start of the extension communication when a communication with the outside apparatus is being held;

a timer that measures a time period elapsed from the start of the extension communication; and a notification system that causes at least one of the cordless handsets performing the extension communication to perform a notifying operation when the time period measured by the timer exceeds a predetermined time period, wherein the extension communication detecting system and the timer are provided to each of the main apparatus and the plurality of cordless handsets, wherein the main apparatus includes an instructing system that instructs at least one of the cordless handsets performing the notifying operation when the time period measured by the timer provided to one of the main apparatus and the plurality of cordless handsets exceeds the predetermined time period, wherein each of the plurality of cordless handsets is configured to transmit a disconnection signal to the main apparatus, the disconnection signal requesting for disconnection from the connection with the outside apparatus when an elapsed time period measured by the timer provided to each of the plurality of cordless handsets exceeds the predetermined period, wherein the instruction system included in the main apparatus is configured to transmit an instruction in response to the disconnection signal to a cordless handset that has transmitted the disconnection signal, and wherein when the cordless handset receives the instruction from the main apparatus, the notifying system causes the cordless handset that has received the instruction to execute the notifying operation.

16. The program product according to claim 15, wherein the instructions cause the main apparatus to have functions of the extension communication detecting system and the timer, wherein the main apparatus includes an instructing system that instructs at least one of the cordless handsets performing the extension communication when the time period measured by the timer exceeds the predetermined time period.

17. The program product according to claim 15, wherein the instructions cause each of the cordless handsets to have functions of the extension communication detecting system and the timer, wherein, when the time period measured by the timer exceeds the predetermined time period, the notification system causes each of the cordless handsets to perform the notifying operation.

* * * * *